United States Patent
Meschke et al.

(10) Patent No.: US 12,195,379 B2
(45) Date of Patent: Jan. 14, 2025

(54) FORMING AND BONDING OF GLASS COMPONENTS FOR PORTABLE ELECTRONIC DEVICES

(71) Applicant: Apple Inc., Cupertino, CA (US)

(72) Inventors: Andrew J. Meschke, Cupertino, CA (US); Thomas Johannessen, San Jose, CA (US); William A. Counts, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 300 days.

(21) Appl. No.: 17/553,105

(22) Filed: Dec. 16, 2021

(65) Prior Publication Data

US 2022/0194840 A1 Jun. 23, 2022

Related U.S. Application Data

(60) Provisional application No. 63/154,205, filed on Feb. 26, 2021, provisional application No. 63/126,880, filed on Dec. 17, 2020.

(51) Int. Cl.
 *C03B 23/03* (2006.01)
 *C03B 23/00* (2006.01)

(52) U.S. Cl.
 CPC ........ *C03B 23/0302* (2013.01); *C03B 23/006* (2013.01); *C03B 23/0307* (2013.01); *C03B 2201/32* (2013.01); *C03B 2215/406* (2013.01)

(58) Field of Classification Search
 None
 See application file for complete search history.

(56) References Cited

U.S. PATENT DOCUMENTS

| | | | |
|---|---|---|---|
| 2,795,084 | A | 6/1957 | Littleton |
| 3,410,673 | A | 11/1968 | Marusak |
| 3,433,611 | A | 3/1969 | Kubican |
| 3,464,880 | A | 9/1969 | Rinehart |
| 3,737,294 | A | 6/1973 | Dumbaugh, Jr. et al. |
| 3,746,526 | A | 7/1973 | Giffon |
| 3,899,315 | A | 8/1975 | Siegmund |
| 4,054,895 | A | 10/1977 | Ham et al. |

(Continued)

FOREIGN PATENT DOCUMENTS

| | | |
|---|---|---|
| CN | 101475300 | 7/2009 |
| CN | 103986803 | 8/2013 |

(Continued)

OTHER PUBLICATIONS

CN 109502958 machine translation, Nakayama Ryuji et al., Lens forming method and a lens forming device, Mar. 2019 (Year: 2019).*

(Continued)

*Primary Examiner* — Queenie S Dehghan
(74) *Attorney, Agent, or Firm* — Brownstein Hyatt Farber Schreck, LLP

(57) ABSTRACT

Techniques for making glass components for electronic devices are disclosed. The techniques disclosed herein can be used to modify a glass workpiece to form a three-dimensional glass component, such as a glass cover member. The techniques may involve reshaping the glass workpiece, fusing glass layers of the workpiece, or combinations of these. Glass components and electronic devices including these components are also disclosed.

12 Claims, 18 Drawing Sheets

(56) References Cited

U.S. PATENT DOCUMENTS

| | | | |
|---|---|---|---|
| 4,070,211 A | 1/1978 | Haran et al. | |
| 4,209,229 A | 6/1980 | Rittler | |
| 4,339,300 A | 7/1982 | Noble et al. | |
| 4,735,917 A | 4/1988 | Flatley et al. | |
| 4,849,299 A | 7/1989 | Loth et al. | |
| 5,122,177 A | 6/1992 | Yoshizama et al. | |
| 5,173,453 A | 12/1992 | Beall et al. | |
| 5,273,553 A | 12/1993 | Hoshi et al. | |
| 5,378,255 A * | 1/1995 | Ito .................... | C03B 11/08 65/226 |
| 6,055,053 A | 4/2000 | Lesniak | |
| 6,067,005 A | 5/2000 | DeVolpi | |
| 6,169,256 B1 | 1/2001 | Hanahara | |
| 6,406,769 B1 | 6/2002 | Delabre et al. | |
| 6,809,278 B2 | 10/2004 | Tsubaki | |
| 6,928,224 B2 | 8/2005 | Beall et al. | |
| 7,115,827 B2 | 10/2006 | Tseng | |
| 7,166,909 B2 | 1/2007 | Moriaga et al. | |
| 7,240,519 B2 | 7/2007 | Schwartz et al. | |
| 7,459,199 B2 | 12/2008 | Skeen | |
| 7,497,093 B2 | 3/2009 | Rosenflanz | |
| 7,507,918 B2 | 3/2009 | Kazama | |
| 7,799,158 B2 | 9/2010 | Yokoyama et al. | |
| 7,902,474 B2 | 3/2011 | Mittleman | |
| 7,915,556 B2 | 3/2011 | Ou | |
| 7,943,953 B2 | 5/2011 | Sakamoto et al. | |
| 7,966,785 B2 | 6/2011 | Zadesky et al. | |
| 8,003,217 B2 | 8/2011 | Rosenflanz | |
| 8,050,019 B2 | 11/2011 | Wennemer | |
| 8,092,737 B2 | 1/2012 | Chang et al. | |
| 8,212,455 B2 | 7/2012 | Yura et al. | |
| 8,277,704 B2 | 10/2012 | Matsushima et al. | |
| 8,379,159 B2 | 2/2013 | Hsu | |
| 8,431,849 B2 | 4/2013 | Chen | |
| 8,446,264 B2 | 5/2013 | Tanase | |
| 8,665,160 B2 | 3/2014 | Uttermann et al. | |
| 8,717,513 B2 | 5/2014 | Park et al. | |
| 8,783,065 B2 | 7/2014 | Schillert et al. | |
| 8,840,997 B2 | 9/2014 | Koyama et al. | |
| 8,898,824 B2 | 12/2014 | Neidich et al. | |
| 9,001,503 B1 | 4/2015 | Hibino | |
| 9,030,440 B2 | 5/2015 | Pope | |
| 9,069,198 B2 | 6/2015 | Kim et al. | |
| 9,110,230 B2 | 8/2015 | Koch, III et al. | |
| 9,125,298 B2 | 9/2015 | Russell-Clarke | |
| 9,134,547 B2 | 9/2015 | McCabe et al. | |
| 9,140,522 B1 | 9/2015 | Miller et al. | |
| 9,154,678 B2 | 10/2015 | Kwong et al. | |
| 9,193,625 B2 | 11/2015 | Bookbinder et al. | |
| 9,232,672 B2 | 1/2016 | Kwong | |
| 9,242,889 B2 | 1/2016 | Yamakaji et al. | |
| 9,249,045 B2 | 2/2016 | Gabel et al. | |
| 9,263,209 B2 | 2/2016 | Chen | |
| 9,302,937 B2 | 4/2016 | Gulati et al. | |
| 9,321,677 B2 | 4/2016 | Chang et al. | |
| 9,359,251 B2 | 6/2016 | Bookbinder et al. | |
| 9,375,900 B2 | 6/2016 | Tsuchiya et al. | |
| 9,390,930 B2 | 7/2016 | Rogers et al. | |
| 9,392,706 B2 | 7/2016 | Yoo et al. | |
| 9,429,997 B2 | 8/2016 | Myers et al. | |
| 9,474,174 B2 | 10/2016 | Motohashi | |
| 9,516,149 B2 | 12/2016 | Wright et al. | |
| 9,522,836 B2 | 12/2016 | Gulati et al. | |
| 9,524,413 B2 | 12/2016 | Kim | |
| 9,632,537 B2 | 4/2017 | Memering et al. | |
| 9,674,322 B2 | 6/2017 | Motohashi et al. | |
| 9,678,540 B2 | 6/2017 | Memering et al. | |
| 9,697,409 B2 | 7/2017 | Myers | |
| 9,718,727 B2 | 8/2017 | Bookbinder et al. | |
| 9,728,349 B2 | 8/2017 | Huang | |
| 9,840,435 B2 | 12/2017 | Ohara et al. | |
| 9,846,473 B1 | 12/2017 | Kalscheur et al. | |
| 9,870,880 B2 | 1/2018 | Zercoe | |
| 9,890,074 B2 | 2/2018 | Liu | |
| 9,897,574 B2 | 2/2018 | Roussev et al. | |
| 9,902,138 B2 | 2/2018 | Edwards | |
| 9,902,641 B2 | 2/2018 | Hall et al. | |
| 9,941,074 B2 | 4/2018 | Tu | |
| 9,946,302 B2 | 4/2018 | Franklin et al. | |
| 9,963,374 B2 | 5/2018 | Jouanno et al. | |
| 10,133,156 B2 | 11/2018 | Pilliod et al. | |
| 10,141,133 B2 | 11/2018 | Bae | |
| 10,146,982 B2 | 12/2018 | Hsu | |
| 10,189,228 B2 | 1/2019 | Couillard et al. | |
| 10,206,298 B2 | 2/2019 | Memering et al. | |
| 10,286,631 B2 | 5/2019 | Alder et al. | |
| 10,318,783 B2 | 6/2019 | Kang | |
| 10,324,496 B2 | 6/2019 | Kwong et al. | |
| 10,357,945 B2 | 7/2019 | Beall et al. | |
| 10,425,994 B2 | 9/2019 | Weiss et al. | |
| 10,494,860 B1 | 12/2019 | Jones et al. | |
| 10,513,455 B2 | 12/2019 | Cook et al. | |
| 10,611,666 B2 | 4/2020 | Jones et al. | |
| 10,694,010 B2 | 6/2020 | Jones et al. | |
| 10,702,211 B2 | 7/2020 | Clavelle et al. | |
| 10,800,141 B2 | 10/2020 | Bartlow et al. | |
| 10,827,635 B1 | 11/2020 | Limarga et al. | |
| 10,875,277 B2 | 12/2020 | Aoki et al. | |
| 10,899,660 B2 | 1/2021 | Luzzato et al. | |
| 10,917,505 B2 | 2/2021 | Jones et al. | |
| 10,919,270 B2 | 2/2021 | Oh et al. | |
| 10,986,744 B2 | 4/2021 | Yeum et al. | |
| 11,066,322 B2 | 7/2021 | Jones et al. | |
| 11,109,500 B2 | 8/2021 | Shannon et al. | |
| 11,192,823 B2 | 12/2021 | Li et al. | |
| 11,199,929 B2 | 12/2021 | Poole et al. | |
| 11,372,137 B2 | 6/2022 | Gu et al. | |
| 11,419,231 B1 | 8/2022 | Lancaster-Larocque et al. | |
| 2003/0040346 A1 | 2/2003 | Fukuda et al. | |
| 2003/0062490 A1 | 4/2003 | Fujieda | |
| 2004/0003627 A1 | 1/2004 | Hashima | |
| 2004/0041504 A1 | 3/2004 | Ozolins | |
| 2004/0105026 A1 | 6/2004 | Campbell et al. | |
| 2005/0135724 A1 | 6/2005 | Helvajian | |
| 2005/0176506 A1 | 8/2005 | Goto | |
| 2008/0049980 A1 | 2/2008 | Castaneda | |
| 2008/0316687 A1 | 12/2008 | Richardson et al. | |
| 2009/0040737 A1 | 2/2009 | Shimura | |
| 2009/0104409 A1 | 4/2009 | Derriey et al. | |
| 2010/0013786 A1 | 1/2010 | Nishikawa et al. | |
| 2010/0108486 A1 | 5/2010 | Yoshida | |
| 2010/0127420 A1 | 5/2010 | Dannoux | |
| 2010/0148996 A1 | 6/2010 | Wang | |
| 2010/0263708 A1 | 10/2010 | Reichart et al. | |
| 2010/0279068 A1 | 11/2010 | Cook et al. | |
| 2010/0285310 A1 | 11/2010 | Izutani et al. | |
| 2010/0330814 A1 | 12/2010 | Yokota | |
| 2011/0019123 A1 | 1/2011 | Prest et al. | |
| 2011/0019354 A1 | 1/2011 | Prest et al. | |
| 2011/0038115 A1 | 2/2011 | Halkosaari | |
| 2011/0041987 A1 | 2/2011 | Hori et al. | |
| 2011/0177300 A1 | 7/2011 | Hankey et al. | |
| 2011/0253520 A1 | 10/2011 | Lim | |
| 2012/0052271 A1 | 3/2012 | Gomez et al. | |
| 2012/0176760 A1 | 7/2012 | Cohen et al. | |
| 2012/0206669 A1 | 8/2012 | Kim | |
| 2012/0212890 A1 | 8/2012 | Hoshino et al. | |
| 2012/0229424 A1 | 9/2012 | Behles et al. | |
| 2012/0236526 A1 | 9/2012 | Weber | |
| 2012/0250273 A1 | 10/2012 | Kuo | |
| 2012/0327325 A1 | 12/2012 | Park et al. | |
| 2013/0128434 A1 | 5/2013 | Yamamoto et al. | |
| 2013/0236699 A1 | 9/2013 | Prest et al. | |
| 2014/0093702 A1 | 4/2014 | Kitajima | |
| 2014/0116090 A1 | 5/2014 | Lee et al. | |
| 2014/0151320 A1 | 6/2014 | Chang et al. | |
| 2014/0272298 A1 | 9/2014 | Memering et al. | |
| 2014/0285956 A1 | 9/2014 | Russell-Clarke et al. | |
| 2014/0311882 A1 | 10/2014 | Terashita | |
| 2014/0335225 A1 * | 11/2014 | Luo .................... | C03B 23/0307 65/273 |
| 2015/0002993 A1 | 1/2015 | Lee | |
| 2015/0030834 A1 | 1/2015 | Morey et al. | |
| 2015/0030859 A1 | 1/2015 | Rogers et al. | |

(56) References Cited

U.S. PATENT DOCUMENTS

| | | |
|---|---|---|
| 2015/0044445 A1 | 2/2015 | Garner et al. |
| 2015/0077830 A1 | 3/2015 | Lin et al. |
| 2015/0093581 A1 | 4/2015 | Murata et al. |
| 2015/0104618 A1 | 4/2015 | Hayashi et al. |
| 2015/0122406 A1 | 5/2015 | Fisher et al. |
| 2015/0163382 A1 | 6/2015 | Kwong et al. |
| 2015/0165548 A1 | 6/2015 | Marjanovic et al. |
| 2015/0202854 A1 | 7/2015 | Tsuchiya et al. |
| 2015/0210588 A1 | 7/2015 | Chang et al. |
| 2015/0212247 A1 | 7/2015 | Borrelli et al. |
| 2015/0232366 A1 | 8/2015 | Fredholm et al. |
| 2015/0241732 A1 | 8/2015 | Kim et al. |
| 2015/0245514 A1 | 8/2015 | Choung |
| 2015/0274572 A1 | 10/2015 | Wada et al. |
| 2015/0299036 A1 | 10/2015 | Ukrainczyk et al. |
| 2016/0028931 A1 | 1/2016 | Kwong et al. |
| 2016/0137550 A1 | 5/2016 | Murata et al. |
| 2016/0224142 A1 | 8/2016 | Yang et al. |
| 2016/0270247 A1 | 9/2016 | Jones et al. |
| 2016/0357294 A1 | 12/2016 | Czeki et al. |
| 2016/0377768 A1 | 12/2016 | Wilson et al. |
| 2017/0027068 A1 | 1/2017 | Dane et al. |
| 2017/0059749 A1 | 3/2017 | Wakatsuki et al. |
| 2017/0066223 A1 | 3/2017 | Notsu et al. |
| 2017/0282503 A1 | 10/2017 | Peng et al. |
| 2017/0300114 A1 | 10/2017 | Matsuyuki et al. |
| 2017/0305788 A1 | 10/2017 | Nikulin |
| 2017/0334770 A1 | 11/2017 | Luzzato et al. |
| 2017/0340518 A1 | 11/2017 | Logunov et al. |
| 2017/0364172 A1 | 12/2017 | Kim et al. |
| 2018/0009697 A1 | 1/2018 | He et al. |
| 2018/0024274 A1 | 1/2018 | Rogers et al. |
| 2018/0067212 A1 | 3/2018 | Wilson et al. |
| 2018/0086026 A1 | 3/2018 | Nguyen et al. |
| 2018/0086663 A1 | 3/2018 | Luzzato et al. |
| 2018/0088399 A1 | 3/2018 | Fukushi et al. |
| 2018/0125756 A1 | 5/2018 | Gerrish et al. |
| 2018/0126704 A1 | 5/2018 | Zhang et al. |
| 2018/0134606 A1 | 5/2018 | Wagner et al. |
| 2018/0154615 A1 | 6/2018 | Dohn et al. |
| 2018/0237325 A1 | 8/2018 | Li et al. |
| 2018/0282207 A1 | 10/2018 | Fujii et al. |
| 2018/0304588 A1 | 10/2018 | Harris et al. |
| 2018/0304825 A1 | 10/2018 | Mattelet et al. |
| 2018/0326704 A1 | 11/2018 | Harris et al. |
| 2018/0370843 A1 | 12/2018 | Gross et al. |
| 2019/0022979 A1 | 1/2019 | Luzzato et al. |
| 2019/0030861 A1 | 1/2019 | Bellman et al. |
| 2019/0033144 A1 | 1/2019 | Andrews et al. |
| 2019/0037690 A1 | 1/2019 | Wilson et al. |
| 2019/0100457 A1* | 4/2019 | Luzzato ............... C03C 19/00 |
| 2019/0134944 A1 | 5/2019 | Dawson-Elli |
| 2019/0160787 A1 | 5/2019 | Bartlow et al. |
| 2019/0161402 A1 | 5/2019 | Harris et al. |
| 2019/0177215 A1 | 6/2019 | Jin et al. |
| 2019/0219463 A1 | 7/2019 | Orihara et al. |
| 2019/0263708 A1 | 8/2019 | Bookbinder et al. |
| 2019/0293838 A1 | 9/2019 | Haba et al. |
| 2020/0014780 A1 | 1/2020 | Jones et al. |
| 2020/0039186 A1 | 2/2020 | Yuan et al. |
| 2020/0055281 A1 | 2/2020 | Yoon et al. |
| 2020/0095159 A1 | 3/2020 | Marshall et al. |
| 2020/0301527 A1 | 9/2020 | Poole et al. |
| 2020/0323440 A1 | 10/2020 | Vule et al. |
| 2020/0339472 A1 | 10/2020 | Yoon et al. |
| 2020/0346525 A1 | 11/2020 | Mannheim Astete et al. |
| 2020/0369560 A1 | 11/2020 | Takeda et al. |
| 2020/0379143 A1 | 12/2020 | Gu et al. |
| 2020/0389991 A1 | 12/2020 | Shannon et al. |
| 2020/0407266 A1 | 12/2020 | Suzuki et al. |
| 2021/0009469 A1 | 1/2021 | Marshall et al. |
| 2021/0014992 A1 | 1/2021 | Limarga et al. |
| 2021/0016547 A1 | 1/2021 | Bartlow et al. |
| 2021/0033757 A1 | 2/2021 | Wilson et al. |
| 2021/0072789 A1 | 3/2021 | Rogers et al. |
| 2021/0212229 A1 | 7/2021 | Yeum et al. |
| 2021/0303031 A1 | 9/2021 | Poole et al. |
| 2021/0361233 A1 | 11/2021 | Wilson et al. |
| 2022/0009823 A1 | 1/2022 | Dejneka et al. |
| 2022/0117094 A1 | 4/2022 | Prest et al. |
| 2022/0193825 A1 | 6/2022 | Van Dyke et al. |
| 2022/0194841 A1 | 6/2022 | Meschke et al. |
| 2023/0014168 A1 | 1/2023 | Poole et al. |

FOREIGN PATENT DOCUMENTS

| | | |
|---|---|---|
| CN | 105765722 | 7/2016 |
| CN | 106007345 | 10/2016 |
| CN | 106341962 | 1/2017 |
| CN | 106485275 | 3/2017 |
| CN | 108017263 | 5/2018 |
| CN | 108285263 | 7/2018 |
| CN | 108545917 | 9/2018 |
| CN | 108600419 | 9/2018 |
| CN | 108632510 | 10/2018 |
| CN | 110857865 | 3/2020 |
| CN | 111655478 | 9/2020 |
| CN | 215010334 | 12/2021 |
| DE | 102016107630 | 10/2017 |
| JP | S6042176 | 9/1985 |
| JP | S6271215 | 5/1987 |
| JP | H03122036 | 5/1991 |
| TW | 201912602 | 4/2019 |
| WO | WO2010/077845 | 7/2010 |
| WO | WO2012/027660 | 3/2012 |
| WO | WO2012/074983 | 6/2012 |
| WO | WO2014/022356 | 2/2014 |
| WO | WO2014/022681 | 2/2014 |
| WO | WO2015/031420 | 3/2015 |
| WO | WO2015/095089 | 6/2015 |
| WO | WO2016/065118 | 4/2016 |
| WO | WO2017/196800 | 11/2017 |
| WO | WO2019/199791 | 10/2019 |
| WO | WO2019213364 | 11/2019 |

OTHER PUBLICATIONS

KR 20200063653 machine translation; Seonki, Park; Apparatus for Shaping Glass plate; Jun. 2020 (Year: 2020).*

CN 108203220, Cui et al., Curved Glass Forming Device of Moving Type, Jun. 2018 (Year: 2018).*

Aben et al., "A New Method for Tempering Stress Measurement in Glass Panels," Estonian Journal of Engineering, vol. 19, No. 4, pp. 292-297, 2013.

Bourhis, "Production Control of Residual Stresses," Glass Mechanics and Technology, Second Edition, pp. 236-243, 2014.

Decourcelle, et al., "Controlling Anisotropy," Conference Proceedings, All Eyes on Glass, Glass Performance Days, Tampere, Finland, Jun. 28-30, 2017.

Mao et al., "Fabrication and characterization of 20 nm planar nanofluidic channels by glass-glass and glass-silicon bonding," www.rsc.org/loc, 8 pages, Jun. 30, 2005.

Moriceau et al., "Overview of recent direct wafer bonding advances and applications," Advances in Natural Sciences: Nanoscience and Nanotechnology, vol. 1, No. 043004, 11 pages, 2010.

Dudutis et al., Bessel beam asymmetry control for glass dicing applications, Procedia CIRP 74, pp. 333-338, 2018.

Jenne et al., "High-quality Tailored-edge Cleaving Using Aberration-corrected Bessel-like Beams," arXiv:2010.10226v1 [physics.optics], May 8, 2018.

Author Unknown, "Handbook for Interior Designers," 3 pages, 1998.

Ungaro et al., "Using phase-corrected Bessel beams to cut glass substrates with a chamfered edge," Applied Optics, vol. 60, No. 3, p. 714, Dec. 10, 2020.

Author Unknown, "Monolithic," definition of monolithic by Merriam-Webster, 3 pages, Sep. 6, 2015.

* cited by examiner

FORMING AND BONDING OF GLASS COMPONENTS FOR PORTABLE ELECTRONIC DEVICES

CROSS-REFERENCE TO RELATED APPLICATION(S)

This application is a nonprovisional application of and claims the benefit of U.S. Provisional Patent Application No. 63/154,205, filed Feb. 26, 2021 and titled "Forming and Bonding of Glass Components for Portable Electronic Devices," and of U.S. Provisional Patent Application No. 63/126,880, filed Dec. 17, 2020 and titled "Forming and Bonding of Glass Components for Portable Electronic Devices," the disclosures of which are hereby incorporated herein by reference in their entireties.

FIELD

The described embodiments relate generally to techniques for forming and bonding glass components for electronic devices. More particularly, the present embodiments relate to techniques which allow glass workpieces to be shaped and/or bonded rapidly.

BACKGROUND

Traditional electronic devices include glass parts such as cover sheets and the like. Some glasses used for cover sheets are hard and resist scratching. However, these glasses can also have high molding and/or fusing temperatures. Therefore, mechanical techniques such as grinding and polishing have traditionally been used to shape cover sheets formed from these glasses.

SUMMARY

Techniques for making glass components for electronic devices are disclosed herein. In embodiments, the techniques disclosed herein can be used to modify a glass workpiece to form a three-dimensional glass component, such as a glass cover member. The techniques may involve reshaping the glass workpiece, fusing glass layers of the workpiece, or combinations of these. The disclosure also relates to glass components and enclosures and electronic devices including the glass components.

In some cases, the shape of the glass workpiece is modified using a forming technique. By the way of example, a first portion of the glass workpiece, which may be a central portion of the glass workpiece, is heated and then shaped between two mold members. A peripheral portion of the workpiece is supported by a frame which is configured to expose the first portion of the glass workpiece. The frame may also help control movement of the glass workpiece during the molding operation. The mold members may be at a lower temperature than the first portion of the glass workpiece, so that the forming technique is a non-isothermal forming technique.

Such a non-isothermal forming technique can produce molded glass components more rapidly than an isothermal forming technique in which the glass workpiece and the mold members are gradually brought to the same temperature. The non-isothermal forming techniques described herein can be especially useful for molding glasses which become soft enough to be molded only at relatively high temperatures. For example, the forming techniques disclosed herein can be useful for aluminosilicate glasses and borosilicate glasses.

In additional cases, the glass workpiece is modified using a bonding technique. By the way of example, at least a portion of a workpiece comprising an assembly of glass layers is heated and then pressed between a first tool-piece and a second tool-piece to fuse the glass layers. A peripheral portion of the workpiece is supported by an open frame which is configured to allow the first tool-piece and the second tool-piece to contact the workpiece. The tool-pieces may be at a lower temperature than the heated portion of the glass workpiece, so that the bonding technique is a non-isothermal bonding technique. Such a non-isothermal bonding technique can produce fused glass components more rapidly than an isothermal bonding technique in which the glass workpiece and the mold tool-piece are gradually brought to the same temperature. Therefore, the non-isothermal bonding techniques described herein can be especially useful for bonding glasses which become fusible only at relatively high temperatures.

The disclosure provides a method for making a glass component for an electronic device. The method comprises installing a glass workpiece to an open frame, the glass workpiece retained in the open frame by a peripheral portion of the glass workpiece and having an exposed first surface and an exposed second surface opposite to the exposed first surface when the glass workpiece is installed in the open frame. The method further comprises heating the glass workpiece to a temperature greater than or equal to a softening point and less than or equal to a working point of the glass workpiece. The method additionally comprises thermoforming a first portion of the glass workpiece between a cavity mold contacting the exposed first surface and a core mold contacting the exposed second surface to produce a molded glass workpiece, each of the cavity mold and the core mold heated to a temperature less than the temperature of the glass workpiece. The method also comprises cooling the molded glass workpiece to a temperature less than a glass transition temperature of the glass workpiece, removing the molded glass workpiece from the open frame, and at least partially removing a second portion of the molded glass workpiece to form the glass component, the second portion including at least some of the peripheral portion.

The disclosure also provides a method for making a glass component for an electronic device, the method comprising placing a workpiece in an open frame, the workpiece comprising an assembly of glass layers. The method further comprises heating at least a portion of the workpiece to a temperature greater than or equal to an annealing point and less than or equal to a softening point of the glass layers of the assembly. The method also comprises fusing the assembly of the glass layers to form the glass component by pressing the workpiece between a first tool-piece and a second tool-piece, each of the first tool-piece and the second tool-piece heated to a temperature less than the temperature of the workpiece. The method additionally comprises cooling the glass component to a temperature less than or equal to a glass transition temperature of the glass component and removing the glass component from the open frame.

In addition, the disclosure provides an electronic device comprising an enclosure comprising a rear glass cover member and a sensor assembly coupled to an interior surface of the rear glass cover member and comprising a sensor. The rear glass cover member comprises a first glass layer defining a base region of an exterior surface of the rear glass cover member and a second glass layer fused to the first glass layer and defining at least a portion of a protruding feature, the portion defining a plateau region of the protruding feature.

BRIEF DESCRIPTION OF THE DRAWINGS

The disclosure will be readily understood by the following detailed description in conjunction with the accompanying drawings, wherein like reference numerals designate like elements.

FIG. 12A shows an example of glass layers used to form a workpiece and FIG. 12B shows the glass layers assembled to form the workpiece.

FIG. 13A shows an additional example of glass layers used to form a workpiece and FIG. 13B shows the glass layers assembled to form the workpiece.

Figure 1A:
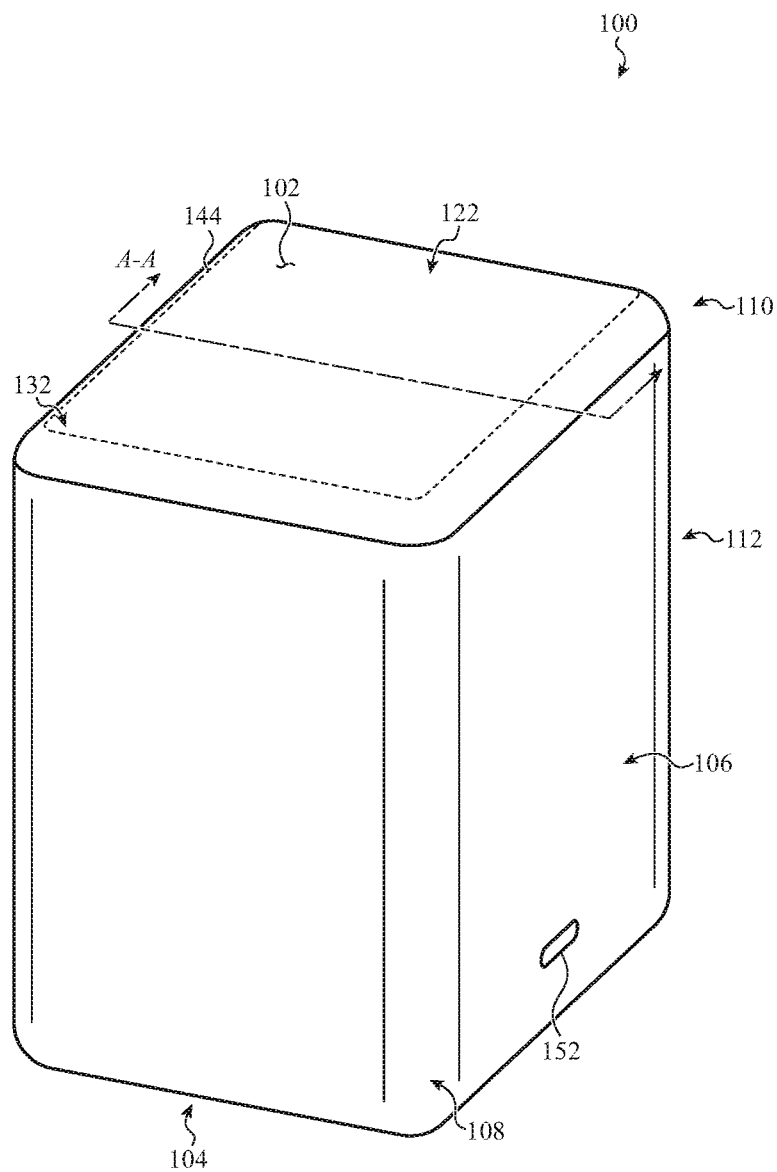
FIG. 1A depicts an example electronic device including a glass component.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to techniques for making glass components for electronic devices. In embodiments, the techniques disclosed herein can be used to modify a glass workpiece to form a three-dimensional glass component, such as a glass cover member. The techniques may involve reshaping the glass workpiece, fusing glass layers of the workpiece, or combinations of these.

In some cases, the shape of the glass workpiece is modified using a forming technique, which may also be referred to herein as a thermoforming technique, a molding technique, a reforming technique, a hot stamping technique, or a (re)shaping technique. By the way of example, a first portion of the glass workpiece, which may be a central portion of the glass workpiece, is heated and then shaped between two mold members. A second portion of the glass workpiece (e.g., a peripheral portion) is supported by a frame which is configured to expose the first portion of the glass workpiece. The frame may also help control movement of the glass workpiece during the forming operation. The mold members may be at a lower temperature than the first portion of the glass workpiece, so that the forming technique is a non-isothermal forming technique.

In additional cases, the glass workpiece is modified using a bonding technique. By the way of example, at least a portion of a workpiece comprising an assembly of glass layers is heated and then pressed between a first tool-piece and a second tool-piece to bond the glass layers. A peripheral portion of the workpiece is supported by an open frame which is configured to allow the first tool-piece and the second tool-piece to contact the workpiece. The tool-pieces may be at a lower temperature than the heated portion of the glass workpiece, so that the bonding technique is a non-isothermal bonding technique.

The non-isothermal forming and/or bonding techniques described herein can produce glass components more rapidly than isothermal forming and bonding techniques in which the glass workpiece and the mold members and/or tool pieces are gradually brought to the same temperature. The non-isothermal forming techniques and/or bonding techniques described herein can be especially useful for forming glasses which become soft enough to be molded only at relatively high temperatures. For example, the techniques disclosed herein can be useful for aluminosilicate glasses and borosilicate glasses.

The disclosure also relates to glass components and enclosures and electronic devices including the glass components. Although the following description provides examples of glass components which can be used as cover members for electronic devices, in additional examples the techniques described herein can be used to produce other types of glass components, such as other types of glass enclosure components.

These and other embodiments are discussed below with reference to FIGS. 1A-17. However, those skilled in the art will readily appreciate that the detailed description given herein with respect to these figures is for explanatory purposes only and should not be construed as limiting.

FIG. 1A depicts an example electronic device 100. In embodiments, the electronic device 100 has an enclosure 110 that includes a glass cover member or other glass component produced by a technique as described herein. In some embodiments, the electronic device 100 may be a digital media player, a portable media player, and/or a home control device. In additional embodiments, the electronic device 100 may be a computing device (e.g., a desktop, notebook, laptop, or tablet computing device), a mobile telephone (also referred to as a mobile phone), an input device, or another type of portable electronic device. As shown in FIG. 1A, the electronic device 100 has a form factor in which the height of the device is greater than both the width and the length of the top face. In addition, the width and the length of the top face of the electronic device 100 are depicted as similar in size. The form factor shown in the example of FIG. 1A is exemplary rather than limiting and in additional examples the height may be less than the width and/or the length, the width and the length of the top face may differ, or both.

As shown in FIG. 1A, the electronic device 100 comprises an enclosure 110 including an enclosure component 112 and a cover 122. The cover 122 may define at least a portion of a front surface 102 of the electronic device and may be referred to as a front cover. In some examples, the enclosure further includes another cover which defines at least a portion of a rear surface 104 of the electronic device and which may be referred to as a rear cover. In embodiments, the cover 122 includes a glass component produced by a technique as described herein. In additional examples, a cover may define another external surface of the electronic device, such as a rear surface, a side surface, or two or more of front, rear, and side surfaces of the electronic device.

Figure 1B:
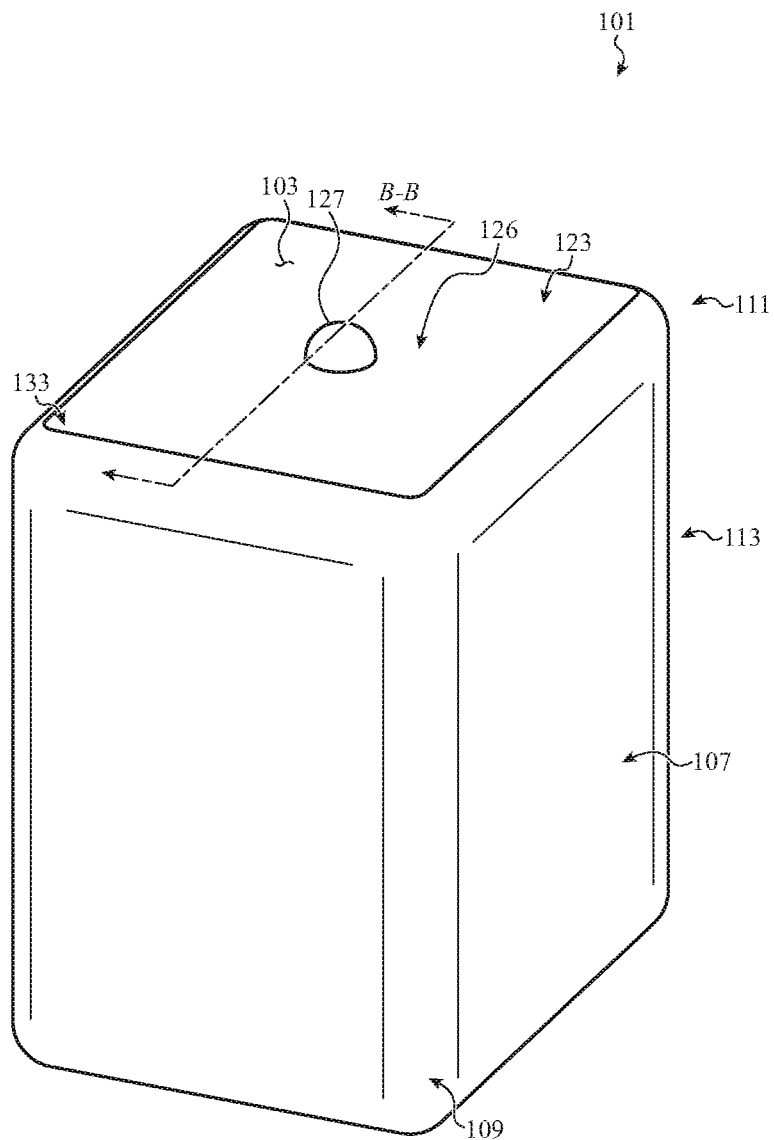
FIG. 1B depicts another example electronic device.
Figure 2:
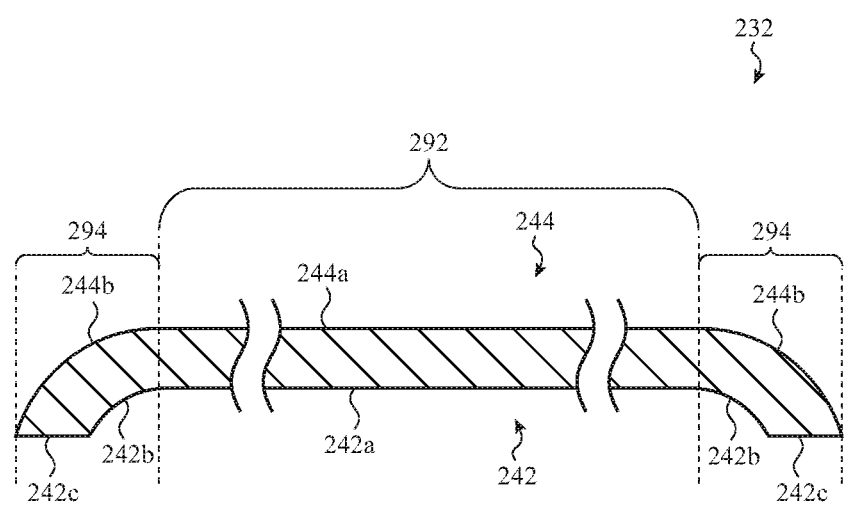
FIG. 2 shows a simplified cross-section view of an example glass component made using a forming technique.

In some embodiments, a cover of the electronic device 100, such as the cover 122, is three-dimensional (e.g., non-planar) or defines a contoured profile. For example, the cover 122 may define a peripheral portion that is not coplanar with respect to a central portion. An example of a three-dimensional shape defining a generally planar central portion and a peripheral portion extending out of the plane defined by the central portion is shown in FIG. 2. The peripheral portion may, for example, define a side wall of an electronic device enclosure, while the central portion defines a front surface (which may define a transparent window that overlies a display). As an additional example, a cover may define a surface protrusion (an example of which is shown in FIG. 1B), a surface recess, and/or one or more curved surfaces. A glass component such as a glass cover member 132 may be shaped similarly to its respective cover.

Figure 17:
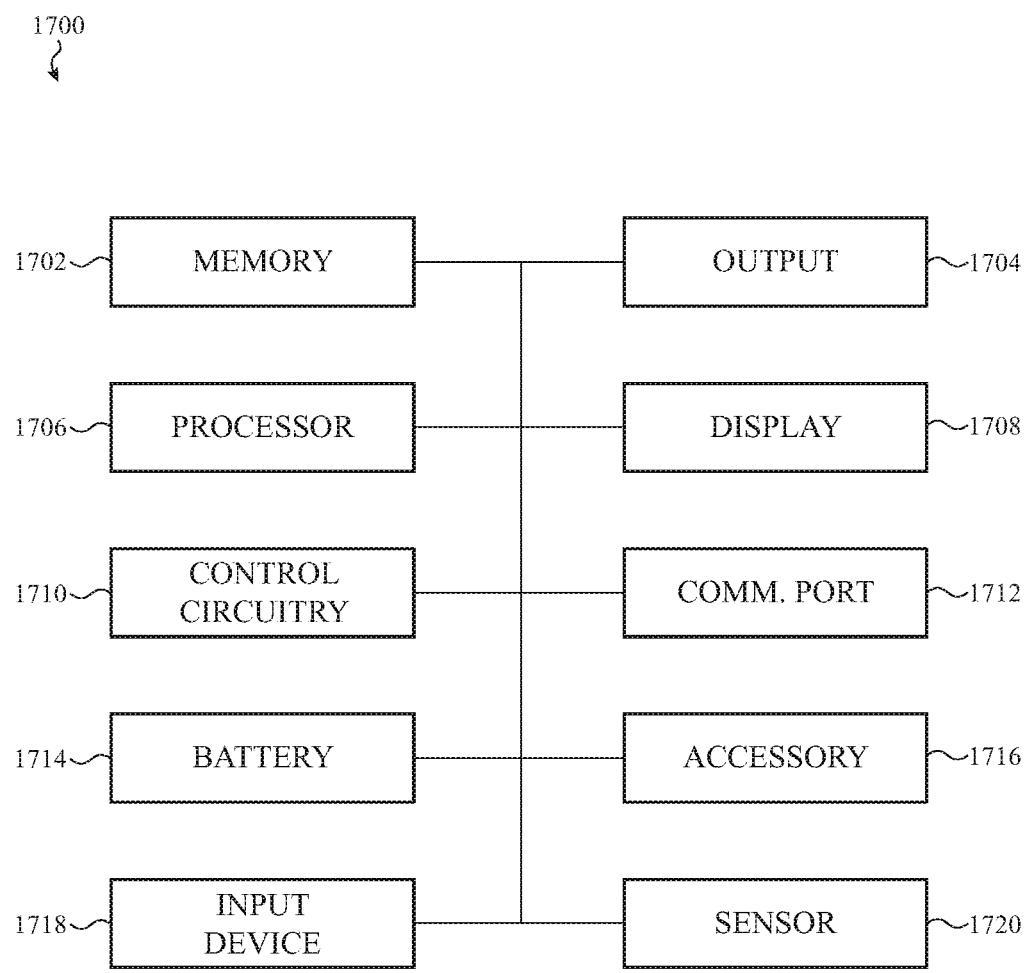
FIG. 17 shows a block diagram of a sample electronic device that can incorporate a glass component.

In the example of FIG. 1A, the cover 122 is positioned over a display 144 that is at least partially enclosed or surrounded by the enclosure component 112 of the enclosure 110. The cover 122 may define a transparent region for viewing the display. Alternately or additionally, the cover 122 may be integrated with or coupled to a touch sensor that is configured to detect or estimate a location of a touch along the exterior surface of the cover 122. The touch sensor may include an array of capacitive electrodes that are positioned below the cover 122 and, in some instances, may be integrated with the display. In additional examples, the cover 122 may be integrated with or coupled to an electronic device component which provides an alternate or an additional functional characteristic. Capacitive and/or other functional characteristics may be associated with planar and/or non-planar regions of the cover 122. The additional description of displays and sensors provided with respect to FIG. 17 is generally applicable herein and is not repeated here.

The cover 122 includes a cover member 132, which may be referred to as a front cover member. The cover member 132 may extend laterally across the cover 122, such as substantially across the width and the length of the cover 122. The cover member 132 may have a thickness from about 0.3 mm to about 0.75 mm or from about 0.5 mm to about 1 mm. In some embodiments the cover member 132 is a glass component (a glass cover member), which may be produced by a technique as described herein. The additional description of glass components provided herein, including the description provided with respect to FIGS. 2, 3A, 3B, 9, and 10, is generally applicable herein. In additional embodiments, the cover member 132 may be formed of one or more materials other than glass, and in some cases may be a glass ceramic cover member. In some embodiments, the cover 122 may define one or more holes extending though its thickness, with the hole positioned over another device component such as a microphone, speaker, an optical camera or sensor component, or the like.

The cover 122 may include one or more coatings applied to the cover member. For example, an anti-reflection and/or smudge-resistant coating may be applied to an exterior surface of the cover member. As an additional example, a coating designed to produce a visual effect, such as an opaque mask coating, may be applied to an interior surface of the cover member. In a further example, the cover 122 may include a laminate material (e.g., in sheet form) applied along an interior surface of the cover 122 to provide structural support/reinforcement, an electrical function, a thermal function, and/or a visual effect. The laminate material may conform to a three-dimensional portion of the cover.

As shown in FIG. 1A, the enclosure 110 further includes an enclosure member 112, which for simplicity may also be referred to herein as a housing. The cover 122 may be coupled to the enclosure member 112. For example, the cover 122 may be coupled to the enclosure member with an adhesive, a fastener, an engagement feature, or a combination thereof.

In embodiments, the enclosure member 112 at least partially defines a side surface 106 of the electronic device 100. In the example of FIG. 1A, the enclosure member 112 defines all four sides of the electronic device 100. The enclosure member 112 of FIG. 1A also defines corner regions 108. FIG. 1A includes vertical lines to indicate approximate boundaries of the corner regions 108. One or more of the corner regions may define a compound curvature. In additional embodiments, an enclosure member 112 may be positioned internal to the electronic device 100 and one or more of a front cover 122 or a rear cover may define all or most of the side surfaces of the electronic device. In the example of FIG. 1A, the electronic device 100 includes an input device 152, which may be a button or any other input device described with respect to FIG. 17. The enclosure component 112 may define an opening to accommodate the input device. In additional examples, an enclosure component may define one or more openings in a side surface to allow (audio) input or output from a device component such as a microphone or speaker, to provide a window for transmission and/or receipt of a wireless signal, and/or to accommodate an electrical port or connection.

In some embodiments, the enclosure component 112 may be formed from a single material, and may be a monolithic component. For example, the enclosure component 112 may be formed from a glass material, a metal material, a ceramic material, a glass ceramic material, or a polymer material. In some cases, the enclosure component is a glass component as described herein. In additional embodiments, an enclosure component may include multiple members. For example, the enclosure component may include one or more metal members, one or more glass members, or one or more glass ceramic members. In some cases, one or more of the glass members may be a glass component as described herein. In some cases, an enclosure member is formed from a series of metal segments that are separated by dielectric segments that provide electrical isolation between adjacent metal segments. For example, a dielectric segment may be provided between a pair of adjacent metal segments. One or more of the metal segments may be coupled to internal circuitry of the electronic device 100 and may function as an antenna for sending and receiving wireless communication. The dielectric segments may be formed from one or more dielectric materials such as a polymer, a glass, or a ceramic material. As referred to herein, a component or member formed from a particular material, such as a glass or a metal material, may also include a relatively thin coating of a different material along one or more surfaces, such as an anodization layer, a physical vapor deposited coating, a paint coating, a primer coating (which may include a coupling agent), or the like.

In addition to a display and/or a touch screen, the electronic device 100 may include additional components. These additional components may comprise one or more of a processing unit, control circuitry, memory, an input/output device, a power source (e.g., a battery), a charging assembly (e.g., a wireless charging assembly), a network communication interface, an accessory, a sensor, or another component that is part of a wireless communication system (e.g., an antenna, a transmitter, receiver, transceiver, or the like). Components of a sample electronic device are discussed in more detail below with respect to FIG. 17 and the description provided with respect to FIG. 17 is generally applicable herein.

FIG. 1B shows another example of an electronic device 101. In embodiments, the electronic device 101 has an enclosure 111 that includes a glass cover member or other glass component produced by a technique as described herein. The electronic device 101 may be any of the electronic devices previously described with respect to the electronic device 100 and may have any of the form factors previously described with respect to that device.

As shown in FIG. 1B, the enclosure 111 includes a cover 123. The cover 123 includes a cover member 133. The cover member 133 may define at least a portion of a front surface 103 of the electronic device and may be referred to as a front cover member. The cover member 133 may extend laterally across the cover 123, such as substantially across the width and the length of the cover 123. In some embodiments the cover member 133 is a glass component (a glass cover member), which may be produced by a technique as described herein. In additional embodiments, the cover member 133 may be formed of one or more materials other than glass, and in some cases may be a glass ceramic cover member. The glass cover member 133 may be shaped similarly to the cover 123.

In the example of FIG. 1B, the cover 123 defines a protruding portion 127 which protrudes with respect to another portion 126 of the cover. The protruding portion 127 may also be referred to herein as a protruding feature or simply as a feature. More generally, a glass component such as the cover member 133 may define one or more features which vary in elevation with respect to a neighboring portion or region of the glass component. A feature which is formed to a different elevation than a neighboring portion of the glass component may define a protrusion or a recess in some embodiments. In some cases, a device component such as a sensor assembly, a camera assembly, and the like may be provided under a protruding feature. The size of the protruding portion 127 may depend at least in part on the size of a device component underlying the protruding feature. In some embodiments, a lateral dimension (e.g., a width) of the protruding feature may be from about 2 mm to about 10 mm, from about 5 mm to about 30 mm, from about 10 mm to about 20 mm, or from about 15 mm to 30 mm.

In the example of FIG. 1B, the protruding feature 127 is shown as generally curved or rounded in shape. However, this example is not limiting and in other examples (e.g., FIG. 3B), a protruding feature may define a substantially plateau-shaped top. The plateau-shaped top may be substantially parallel to an exterior surface defined by an adjacent portion of the cover. The amount of protrusion or offset between the top of the protruding portion 127 and the exterior surface of the adjacent portion of the cover may be from about 0.5 mm to about 1.5 mm or from about 0.75 mm to about 2 mm.

When the glass cover member 133 is shaped similarly to the cover 123, the glass cover member 133 may also define a protruding feature. Non-limiting examples of glass cover members defining protruding features are shown in the cross-section views of FIGS. 3A, 3B, 9, and 10.

In some examples, a cover member 133 that defines a protruding feature has substantially the same thickness as a neighboring portion of the cover member. In some cases, the cover member 133 is produced by reshaping a glass workpiece of substantially uniform thickness to form a protruding feature. As shown in the cross-sectional view of FIGS. 3A and 3B, the resulting protruding feature may be convex on the exterior and concave on the interior of the cover member. In examples, the thickness of the cover member may be greater than about 0.3 mm and less than about 0.75 mm or greater than about 0.5 mm and less than about 1 mm in both portion 127 and portion 126 of the cover 123.

Figure 12C:
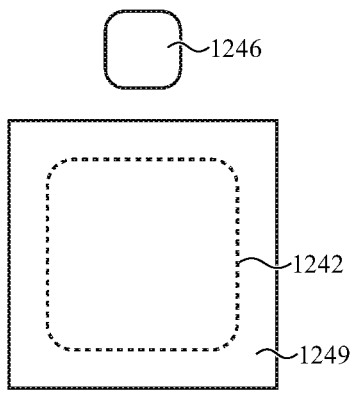
FIG. 12C shows the workpiece of FIG. 12B placed into an open frame.
Figure 12C:
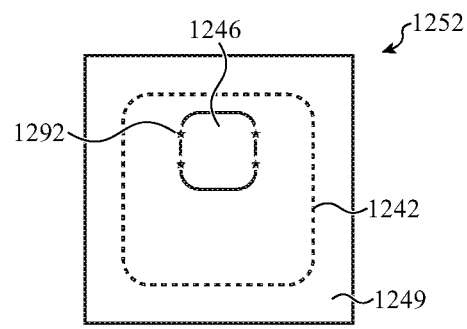
Figure 12C:
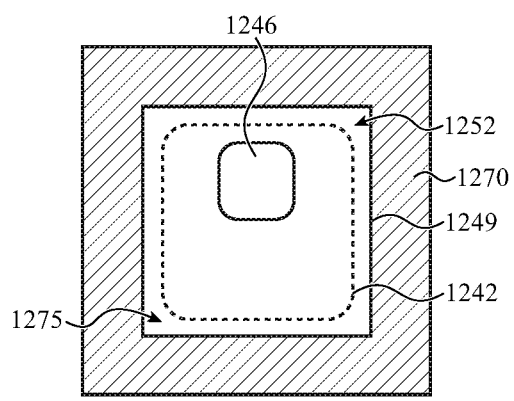

In additional examples, the cover member 133 varies in thickness. The cover member 133 may have a greater thickness in a protruding portion than in an adjacent portion as shown in the cross-sectional views of FIGS. 9 and 10. In some cases, the cover member 133 is at least partly produced by bonding multiple glass layers, and differences in the number of glass layers produce differences in the thickness of the cover member 133, as shown in the example of FIGS. 12A through 12C. In embodiments, the cover member 133 may have a thickness in the protruding portion 127 that is at least 10%, 25%, or 50% and up to about 250% greater than a thickness of the cover member in the portion 126 of the cover 123. In some cases, the thickness of the thicker portion of the cover 123 (including the protruding feature) is greater than about 1 mm and less than or equal to about 2 mm or about 2.5 mm. The thickness of the portion 126 of the cover 123 may be greater than about 0.3 mm and less than about 0.75 mm or greater than about 0.5 mm and less than about 1 mm.

Figure 9:
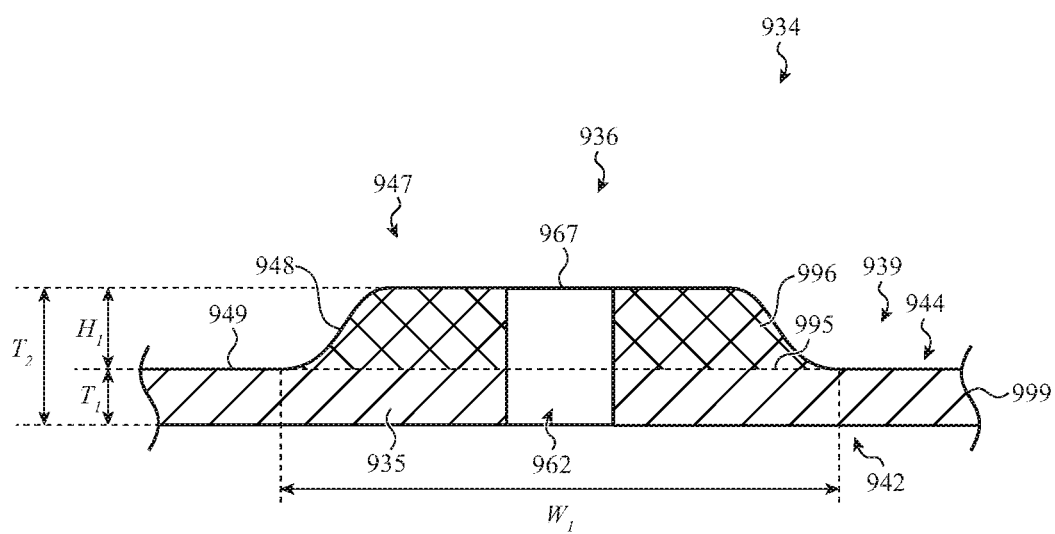
FIG. 9 shows a partial cross-section view of an example glass component made using a bonding technique.
Figure 10:
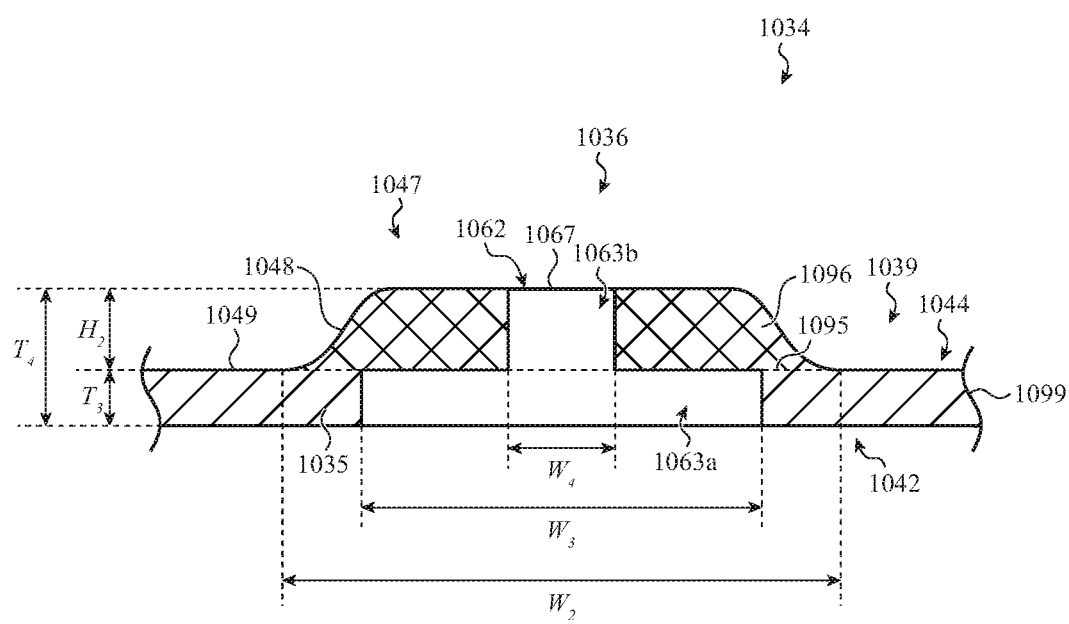
FIG. 10 shows a partial cross-section view of another example glass component made using a bonding technique.

In some embodiments, the cover 123 may define one or more holes extending though its thickness, also referred to herein as through-holes. The one or more holes may facilitate positioning of one or more device components, such as a speaker or an optical module of a camera assembly or sensor assembly. In some cases, a hole may be formed into the protruding feature 127 and a device component may extend at least partially into the hole in the protruding feature. By the way of example, the electronic device may include one or more optical modules selected from a camera modules, an optical sensor module, an illumination module, and a (non-optical) sensor. In some examples, a window may be provided over the hole to protect the underlying device component. When the glass cover member 133 is shaped similarly to the cover 123, the glass cover member may also define one or more through-holes, non-limiting examples of which are shown in the examples of FIGS. 3B, 9, and 10.

In some cases, the cover 123 may be integrated with or coupled to a touch sensor or another electronic device component which provides a functional characteristic to the cover. The cover 123 may include one or more coatings applied to the cover member and these coatings may be similar to the coatings previously described with respect to the cover 122. In some examples, the cover 123 may include a laminate material applied along an interior surface of the cover 123 in a similar fashion as described with respect to FIG. 1A.

The enclosure 111 of the electronic device 101 also includes an enclosure member 113. The enclosure member 113 at least partially defines a side surface 107 of the electronic device 100. In the example of FIG. 1B, the enclosure member 113 defines all four sides of the electronic device 101. The enclosure member 113 of FIG. 1B also defines corner regions 109. The enclosure member may be similar in construction and materials to the enclosure member 112 and those details are not repeated here.

In addition to a display and a camera assembly, the electronic device 101 may include additional components. For example, the electronic device may include one or more sensor assemblies and/or camera assemblies. As additional examples, the electronic device may comprise one or more of a processing unit, control circuitry, memory, an input/output device, a power source (e.g., a battery), a charging assembly (e.g., a wireless charging assembly), a network communication interface, an accessory, and a sensor. Components of a sample electronic device are discussed in more detail below with respect to FIG. 17 and the description provided with respect to FIG. 17 is generally applicable herein.

FIG. 2 shows a simplified cross-section view of an example glass component 232. The glass component 232 defines a three-dimensional shape and may be an example of the cover member 132 of FIG. 1A. The cross-section view may be along A-A in FIG. 1A. The three-dimensional shape of the glass component 232 may be referred to as a "dish" shape.

The glass component 232 may be described as defining a generally planar central portion and a peripheral portion extending from the generally planar central portion. As shown in FIG. 2, the glass component 232 includes a central portion 292 and a peripheral portion 294 which extends out of the plane defined by the central portion 292. The central portion 292 and the peripheral portion 294 are contiguous. The peripheral portion 294 shown in FIG. 2 defines an angle with respect to the generally planar central portion 292 (as seen in the cross-section view). The peripheral portion 294 may therefore be referred to herein as an angled portion. In the example of FIG. 2, the peripheral portion 294 defines an obtuse angle with respect to the generally planar central portion, but this example is not limiting, and, in some embodiments, a peripheral portion may define a ninety-degree angle or an acute angle with respect to a central portion. The three-dimensional shape shown in FIG. 2 is exemplary rather than limiting and the techniques described herein can be used to produce a variety of three-dimensional shapes, including shapes where the central portion is curved rather than planar.

In the example of FIG. 2, the glass component 232 defines interior and exterior surfaces (242, 244) which are generally planar in the central portion 292 of the cover and curved in the peripheral portion 294 of the cover. As shown, the interior and exterior surfaces in the peripheral portion generally curve towards the interior of the electronic device. In other words, the curve defined by the interior and exterior surfaces in the peripheral portion is concave with respect to an interior of the electronic device. As shown in FIG. 2, the central portion 292 includes the central exterior surface 244a and the central interior surface 242a. The peripheral portion 294 includes the peripheral exterior surface 244b, the transitional interior surface 242b, and the peripheral interior surface 242c. The peripheral interior surface 242c is offset from the central interior surface 242a; the transitional interior surface 242b provides a transition between the peripheral interior surface 242c and the central interior surface 242a. The curvature and/or the curve length of the peripheral exterior surface 244b and of the transitional interior surface 242b is not limited to the example of FIG. 2 and the curvature and/or the curve length may be larger or smaller than that shown.

In some cases, the glass component has a smooth surface. When the roughness of the glass component is measured by an arithmetical mean height (e.g., $R_a$ or $S_a$), one or more surfaces of the glass component may have a surface roughness greater than zero and less than about 250 nm, 150 nm, 100 nm, 50 nm, 25 nm, or 10 nm. The glass component may also have a transmittance and clarity sufficiently high enough that a high resolution graphic produced by a display is not distorted.

Typically, the glass component is formed from a silica-based glass material. The glass material may have a network structure, such as a silicate-based network structure. As referred to herein, a "glass cover member," a "glass component," a "glass workpiece," a "glass sheet," a "glass layer," and/or a "glass piece" may include some relatively small amount of impurities or crystalline material, such as 1% or less, 2% or less, or 5% or less by weight of the member.

In some embodiments, the glass material includes an aluminosilicate glass. As used herein, an aluminosilicate glass includes the elements aluminum, silicon, and oxygen, but may further include other elements. Typically, the glass material includes an ion-exchangeable glass material, such as an alkali metal aluminosilicate glass (e.g., a lithium aluminosilicate glass). An ion-exchangeable aluminosilicate glass may include monovalent or divalent ions that compensate for charges due to replacement of silicon ions by aluminum ions. Suitable monovalent ions include, but are not limited to, alkali metal ions such as $Li^+$, $Na^+$, or $K^+$. Suitable divalent ions include alkaline earth ions such as $Ca^{2+}$ or $Mg^{2+}$. In some embodiments, the glass material includes a crystallizable glass.

Figure 3A:
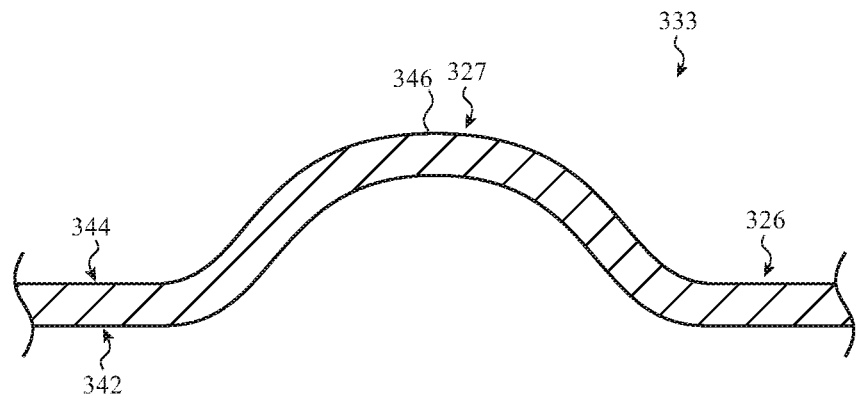
FIG. 3A shows a simplified partial cross-section view of another example glass component.
Figure 3B:
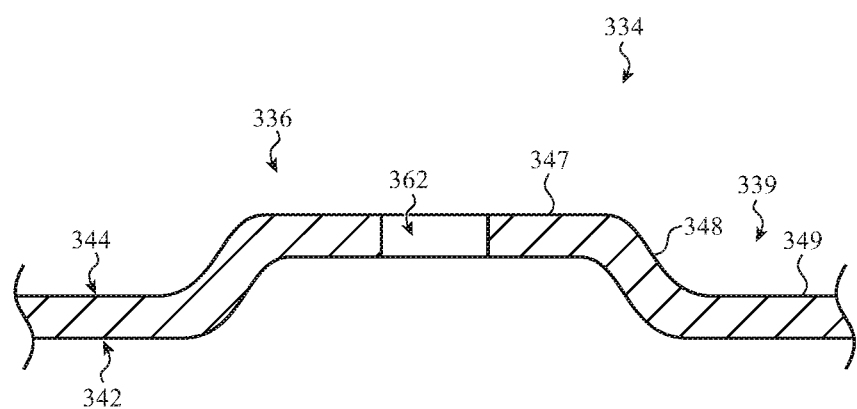
FIG. 3B shows a simplified partial cross-section view of another example glass component.

FIG. 3A shows a simplified partial cross-section view of an example glass component 333. The glass component 333 defines a three-dimensional shape which includes a protruding feature 327. The glass component 333 may be an example of the glass cover member 133 described with respect to FIG. 1B and the cross-section view may be along B-B in FIG. 1B. The shape of the protruding feature shown in FIG. 3A is exemplary rather than limiting and the techniques described herein can be used to produce a variety of three-dimensional shapes.

The protruding portion 327 protrudes with respect to an adjacent portion 326 of the glass component 333. As shown in FIG. 3A, the protruding portion 327 defines a top 346. Each of an exterior surface 344 and an interior surface 342 of the glass component 333 defines a curved contour at the protruding portion 327. The exterior surface 344 is convexly curved and the interior surface 342 is concavely curved at the protruding portion 327.

In the example of FIG. 3A, the protruding portion 327 has about the same thickness as an adjacent portion 326 of the glass component. The example of FIG. 3A is not limiting, and in additional examples, a protruding portion may be thicker or thinner than an adjacent portion of the glass component. FIGS. 9 and 10 show examples of glass components having thicker protruding portions.

FIG. 3B shows a simplified partial cross-section view of another example glass component 334. The glass component 334 defines a three-dimensional shape which includes a protruding feature 336. The glass component 334 may be an example of the cover member 133 of FIG. 1B and the cross-section view may be along B-B in FIG. 1B. For simplicity, only one through-hole 362 is shown in FIG. 3B, but the protruding feature may include additional through-holes as previously described with respect to FIG. 1B. The shape of the protruding feature shown in FIG. 3B is exemplary rather than limiting and the techniques described herein can be used to produce a variety of three-dimensional shapes.

The glass component 334 defines an exterior surface 344 and an interior surface 342. The glass component also includes a base portion 339 which defines a base region 349 of the exterior surface 344. The glass component 334 also defines a protruding feature 336 which protrudes with respect to the base region 349 and defines a top region 347 and a side region 348 of the protruding feature 336. As shown in cross-section view of FIG. 3B, the protruding feature 336 defines a convex exterior surface and a concave interior surface. The thickness of the base portion 339 of the glass component 334 is about the same as the thickness of the protruding feature 336. In embodiments, the cover member 334 is produced by reshaping a glass workpiece of substantially uniform thickness to form the protruding feature 336.

Figure 4:
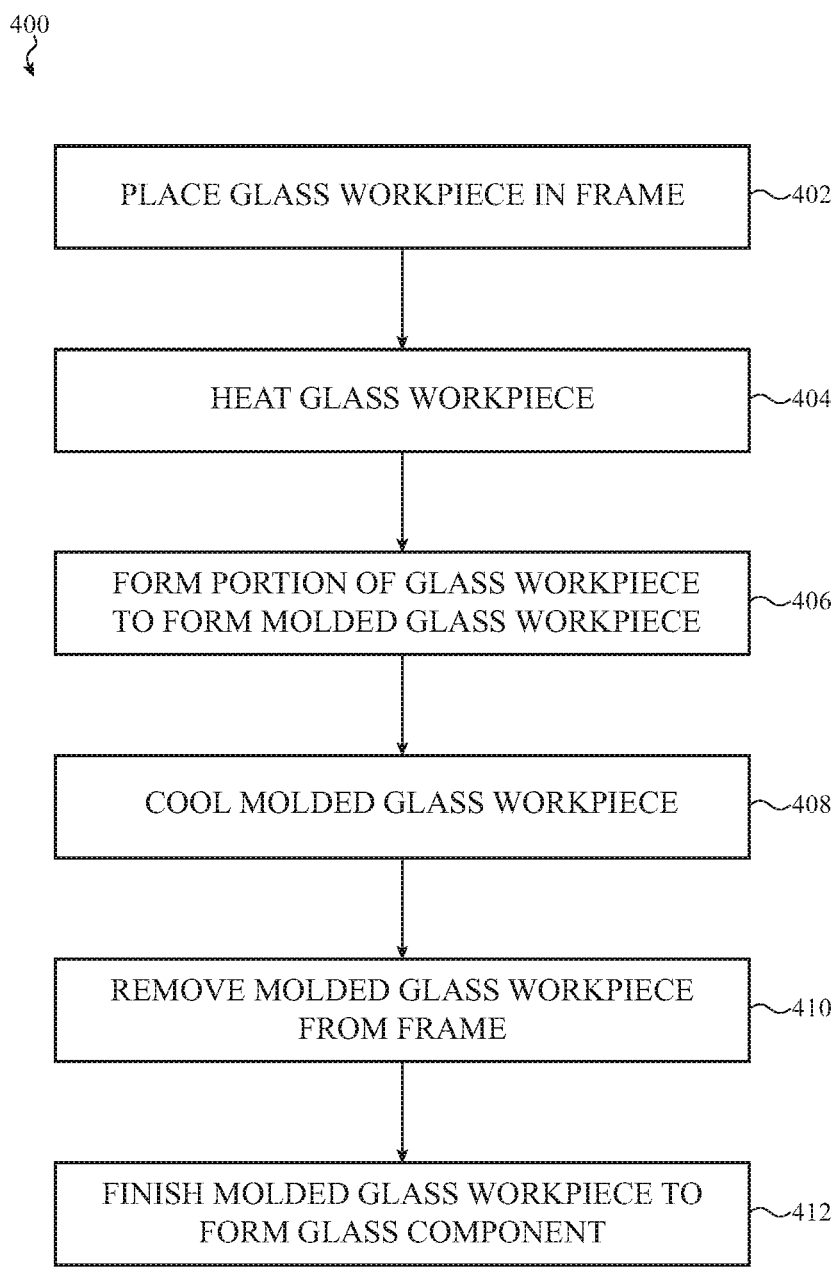
FIG. 4 shows a flowchart of a forming process for making a glass component.
Figure 5:
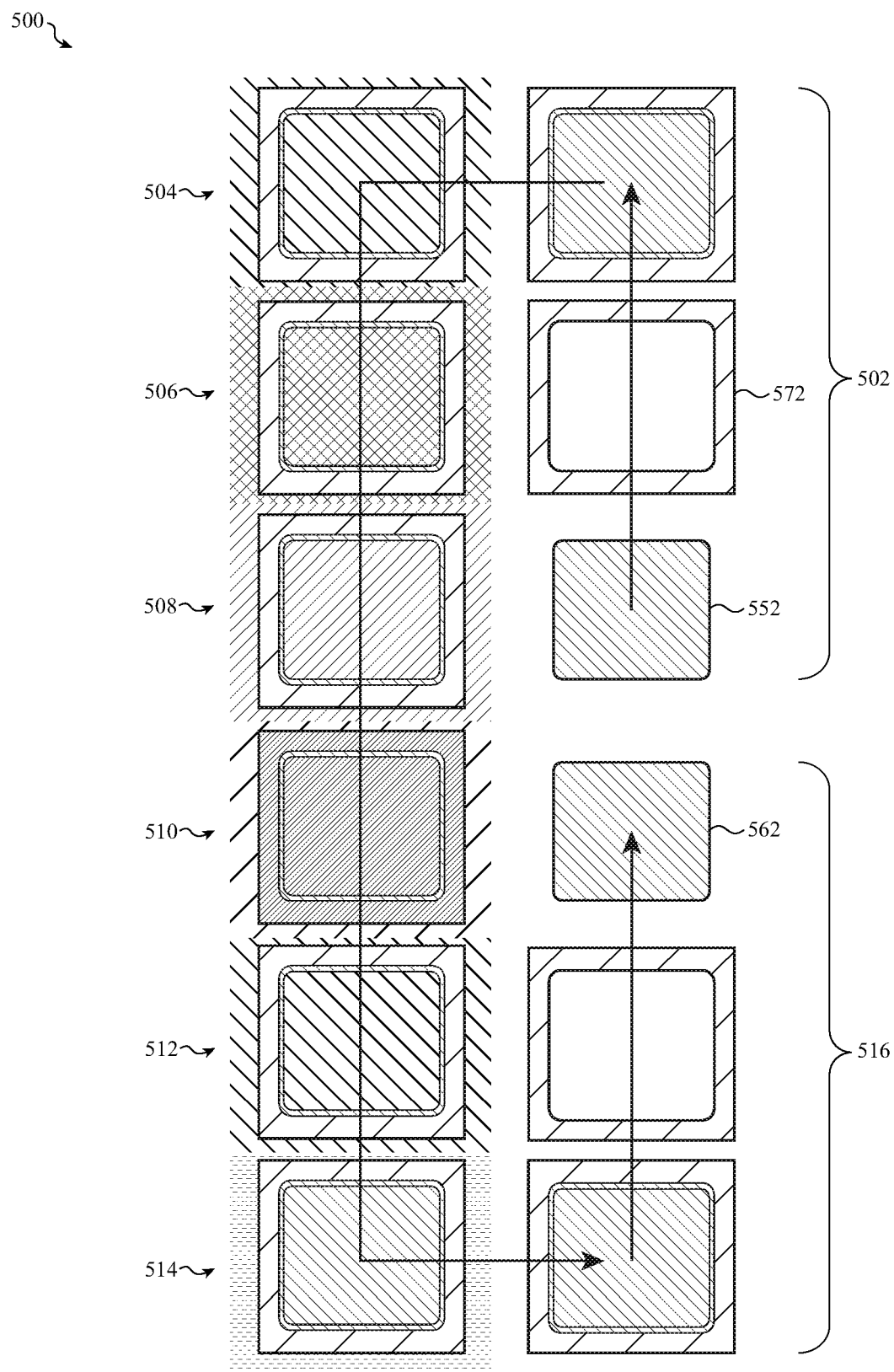
FIG. 5 schematically shows a series of stages in a process for forming a glass component.

As previously discussed, the present disclosure provides forming techniques, which may be non-isothermal forming techniques. FIG. 4 shows a flow chart of an example process 400 for making a glass component by forming a glass workpiece. The process 400 may be performed at several stations, as schematically shown in FIG. 5. The time spent at each station may be limited to more rapidly produce the glass component. For example, the time spent at each station may be 30 seconds or less, 20 seconds or less, from 2 seconds to 30 seconds, or from 5 seconds to 20 seconds.

In some cases, the glass workpiece (which may also be referred to herein as a blank or a preform) may be a sheet of glass which is substantially flat and of substantially uniform thickness. In some examples the glass workpiece may have a thickness from about 300 microns to about 2 mm, from about 300 microns to about 1 mm, from about 0.3 mm to about 0.75 mm, from about 0.5 mm and to about 1 mm, or from about 0.5 mm to about 1.5 mm. In additional cases, the glass workpiece may have a non-uniform thickness and/or may have a shape other than a flat shape. For example, the shape of the glass workpiece may be engineered to facilitate the forming process. The glass workpiece may have lateral dimensions larger than those of the glass component to facilitate its placement in a frame, as described in more detail below. The glass workpiece may be formed from any of the glass materials previously described with respect to FIG. 2. In some examples the glass workpiece may be cleaned and/or may be treated with one or more surface treatments such as etching and plasma treatment prior to placement in the frame. The glass workpiece may have a smooth surface finish in order to provide good contact between the glass workpiece and the mold surfaces and/or to minimize polishing in the finishing operation(s) 412. As examples, the glass workpiece may have a surface roughness (e.g., $R_a$ or $S_a$) greater than zero and less than about 250 nm, 150 nm, 100 nm, 50 nm, 25 nm, or 10 nm.

Figure 8:
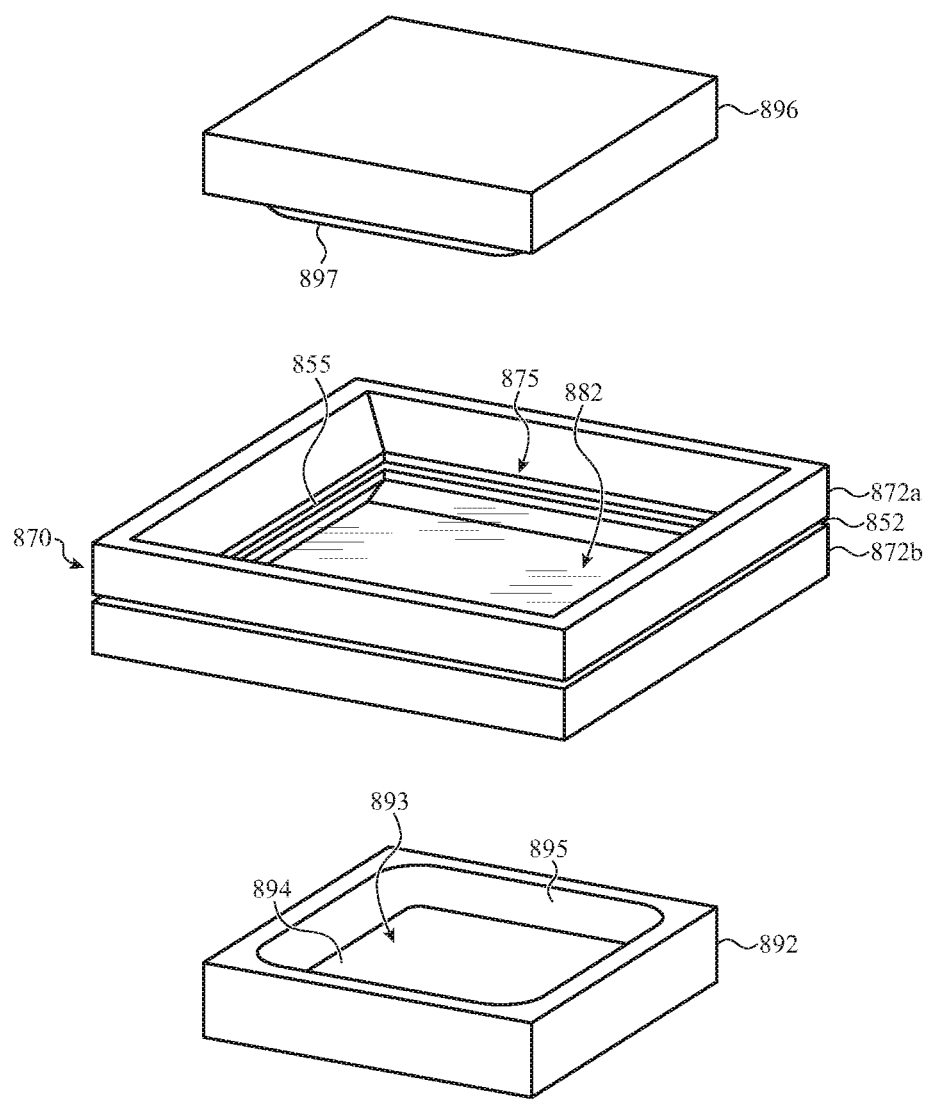
FIG. 8 shows an exploded view of a frame supporting a glass workpiece and core and cavity molds.

The process 400 includes an operation 402 of placing the glass workpiece in a frame. The frame typically forms an outline around a peripheral portion of the glass workpiece and is open over a central portion of the glass workpiece as shown in FIG. 8. The frame may be open over both faces of the central portion of the glass workpiece and may therefore be referred to herein as an open frame. The open frame may expose a portion of the glass workpiece to be molded, which may also be referred to herein as a central portion of the glass workpiece. The frame typically supports the peripheral portion of the glass workpiece. The frame carries the glass workpiece through multiple operations of the process 400, as schematically shown in FIG. 5.

Figure 6A:
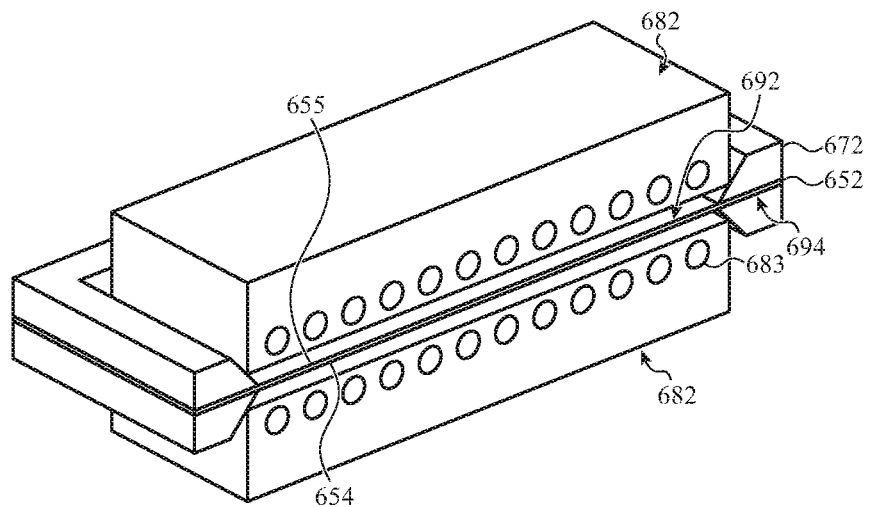
FIG. 6A schematically shows an example of an operation of heating a glass workpiece.
Figure 6B:
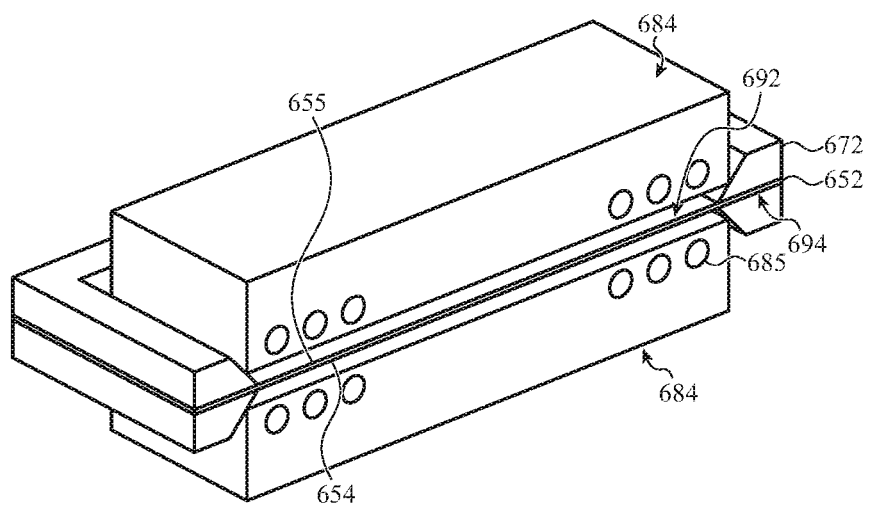
FIG. 6B schematically shows another example of an operation of heating a glass workpiece.

In some cases, the frame includes two components, and the glass workpiece is placed between these two components as shown in the examples of FIGS. 6A, 6B, and 8. This type of frame may also be referred to herein as a sandwich frame. In additional cases, the frame may be formed of a single member which forms a tray which supports the glass workpiece. Portions of a frame or frame component which face the glass workpiece may also be referred to herein as a face of the frame or frame component.

When the glass workpiece is held horizontally, the frame may include an upper frame component and a lower frame component. In some embodiments, the sandwich frame constrains movement of the peripheral portion of the glass workpiece. The movement (e.g., float) may be in directions parallel to faces of the frame (referred to as the x and y directions) and/or in directions perpendicular to the faces of the frame (referred to as the z direction). In some cases where the glass workpiece moves within the frame during the forming process, some of the peripheral portion positioned within the frame prior to the forming process may be drawn into contact with the cavity mold and the core mold during the forming process. Therefore, the size of the exposed central portion and the size of the peripheral portion within the frame may change during the forming process. As examples, the frame may control movement of the glass workpiece due to the weight of an upper frame component sitting on the glass and/or due to application of pressure to compress the two frame components against the glass workpiece. Pressure may be applied by mechanical elements such as springs, cam-locks, clamp bolts at a prescribed torque, or the like. Additional compression forces may be generated by expansion of the frame and/or the glass materials during heating.

The frame is typically configured to withstand elevated temperatures. In cases where the frame experiences significant heating during the process 400, the members of the frame may be formed from one or more materials such as high purity chromium (e.g., a purity of a least 99.95%), noble metals (e.g., Pt, Rd, Ir, or alloys thereof such as Pt—Ir), or ceramic materials such as tungsten carbide, alumina, zirconia, and the like. For example, members of the frame may be formed from bulk chromium or ceramic materials. In some cases, noble metal or ceramic coatings may be applied to these bulk chromium or ceramic members or to members made from less temperature sensitive metals or alloys. In other cases where the frame is somewhat shielded from heating during the process 400, the members of the frame can be formed from other materials such as nickel-based superalloys such as INCONEL® or STEL-LITE® alloys.

The process 400 also includes an operation 404 of heating the glass workpiece. The operation 404 may include one or more heating stages. The number of heating stages may depend on the composition and/or shape of the glass component. FIG. 5 schematically illustrates a process which includes multiple heating stages (504, 506, and 508) prior to a forming operation. In some embodiments, at least a portion of the glass workpiece is heated to a temperature high enough to soften it for the forming operation 406. The operation 404 may take place in an air atmosphere or in a vacuum or inert gas atmosphere (e.g., nitrogen, argon, and mixtures of these).

The glass workpiece may be heated by a variety of methods. In some cases, the glass workpiece may be heated by radiation and/or conduction of heat. In some examples a horizontal glass workpiece may be heated from above and below with a pair of heaters, as schematically illustrated in FIGS. 6A and 6B. The heaters may be infrared heaters. In some cases, the heaters may include a susceptor that is inductively heated. In additional examples, the glass workpiece may be heated using a laser, a direct flame, or by combinations of one or more heating methods.

The operation 404 may heat an entirety of the glass workpiece or may locally heat the glass workpiece. In some cases, an entire central portion of the glass workpiece may be heated, as shown schematically in FIG. 6A. In additional cases, the heating may be concentrated in portions of the glass workpiece where the most deformation and/or reshaping is to occur. FIG. 6B shows an example of a heated region localized to a perimeter of the central region.

For silicate glasses, plots of viscosity versus temperature can be used to identify temperatures relevant to deformation of the glass. For example, the strain point (viscosity of about $10^{14.5}$ Poise) is the temperature at which internal stress in the glass is relieved in hours. The annealing point (viscosity of about $10^{13.2}$ to $10^{13.4}$ Poise) is the temperature at which internal stress in the glass is relieved in minutes. The glass transition temperature (viscosity of about $10^{12}$ to $10^{13}$ Poise) is the temperature at which glass transitions from a supercooled liquid to a glassy state. The dilatometric softening point is defined by a viscosity of about $10^9$ to $10^{11}$ Poise while the Littleton softening point is defined by a viscosity of about $10^{7.6}$ Poise; a "softening point" as referred to herein may refer to either of these temperatures. The working point is defined by a viscosity of about $10^4$ Poise. The melting range may be defined by a viscosity of about $10^{1.5}$ Poise to about $10^{2.5}$ Poise.

In some cases, at least a portion of the glass workpiece may be heated to a temperature range from a softening point to a working point of the glass workpiece in the operation 404. In additional cases, at least a portion of the glass workpiece may be heated to a temperature range from a working point to a melting point of the glass workpiece in the operation 404. In some cases, the glass workpiece may be heated to a temperature from about 800° C. to about 1000° C. The temperature may be controlled so that the glass workpiece does not sag excessively before reaching the molds of the forming process. As an example, the strain point of an aluminosilicate glass such as an alkali aluminosilicate glass may be from about 525° C. to about 575° C.; the annealing point of the aluminosilicate glass may be from about 600° C. to about 650° C., and the working point may be greater than 1000° C., such as from about 1100° C. to about 1300° C. The glass transition temperature may be from about 575° C. to about 625° C. As an additional example, the aluminosilicate glass may be configured to have a lower working temperature and glass transition temperature, such as a working temperature from about 900° C. to about 1100° C. and a glass transition temperature from about 500° C. to about 550° C. In some cases, the (maximum) temperature to which the glass workpiece is heated before forming may be referred to as a first temperature.

The process 400 further includes an operation 406 of forming a portion of the glass workpiece to form a molded glass workpiece. The operation 406 may also be referred to herein as a thermoforming operation, a molding operation, a reforming operation, a hot stamping operation, or a shaping operation and the molded glass workpiece may also be referred to herein as a reformed or a reshaped glass workpiece or simply as a molded, reformed, or reshaped glass workpiece. In some embodiments, at least a portion of the glass workpiece is deformed between multiple mold members to produce a molded glass workpiece. For example, the portion of the glass workpiece may be deformed between a cavity mold and a core mold, examples of which are shown in FIG. 8. The glass workpiece may be deformed by bending, by stretching, by flow, or in some cases by combinations of these. The portion of the glass workpiece that is formed may also be referred to as a first portion of the glass workpiece and the formed portion of the molded glass workpiece may also be referred to as a first portion of the molded glass workpiece.

Pressure may be applied between the mold members, such as the cavity mold and the core mold. For example, the pressure may be applied in a press or other forming apparatus. In some embodiments, additional energy may be supplied to the glass workpiece during the forming operation to facilitate glass flow and/or formability. For example, in some cases the operation 406 may be assisted by use of ultrasonic vibration. The forming process may be completed in 10 seconds or less, such as from about 2 seconds to about 7 seconds or from about 3 seconds to about 5 seconds. The operation 406 may take place in an air atmosphere or in a vacuum or inert gas atmosphere.

As the glass workpiece begins the forming operation 406, at least a portion of the glass workpiece is at a temperature at which the glass can be deformed. In some cases, this portion of the glass workpiece may be at a temperature from a softening point to a working point of the glass workpiece. A temperature about equal to a softening point of the glass workpiece may be useful when the change in shape during forming of the glass workpiece is achieved largely by bending. A temperature about equal to a working point of the glass workpiece may be useful when the change in shape during forming of the glass workpiece is achieved largely by stretching but the glass workpiece retains substantially uniform thickness. Temperatures in a range from a working point to a melting point of the glass workpiece may be useful when the change in shape during forming of the glass workpiece is achieved largely at least in part by flow of the glass material of the glass workpiece. In cases where high shear rates cause shear thinning, adequate viscous flow may occur at lower temperatures than are otherwise possible.

Each of the mold members may be heated to a temperature less than the temperature of the glass workpiece. For example, each of the cavity mold and the core mold may be heated to a temperature within about 75° C., 50° C., or 25° C. of the glass transition temperature for the glass workpiece. In some cases, the cavity and the core molds may be heated to a temperature from 500° C. to 600° C. In some embodiments, the mold temperature may not be uniform, such as when one or more mold temperatures are configured to locally control the viscosity to encourage and/or restrict deformation of the glass workpiece. Contact between the glass workpiece and the cooler cavity mold and core mold during the forming operation can therefore begin to cool the glass workpiece to help retain the shape change from the forming operation. The cooling of the glass workpiece within the mold may be rapid compared to the cooling rates in later cooling operations. The molded glass workpiece may be cooled to a temperature within about 50° C. or 25° C. of the glass transition temperature for the glass workpiece before the molded glass workpiece (in the frame) is removed from the mold. In some cases, the (maximum) temperature to which the mold member(s) is/are heated before forming may be referred to as a second temperature.

In some cases, the peripheral portion of the glass workpiece may tend to move within the frame during the forming operation. In embodiments, movement of the peripheral portion of the glass workpiece within the frame is controlled by the weight of a frame component sitting on the glass and/or due to application of pressure to compress the two frame components against the glass workpiece. Pressure may be applied to compress the two frame components against the glass workpiece as previously discussed with respect to operation 402. The peripheral portion of the glass workpiece may define a peripheral portion of the molded glass workpiece, also referred to herein as a flange of the molded glass workpiece.

In some cases, the cavity of the cavity mold defines surfaces having different orientations. In some examples, the cavity of the cavity mold may be defined by a substantially planar recessed surface and a wall surface extending from the planar recessed surface. An example of this shape is shown in FIG. 8. A first region of the glass workpiece may be molded against the planar recessed surface and a second region of the glass workpiece may be molded against the wall surface. The first region and the second region may be located within the central portion of the glass workpiece.

The first region of the glass workpiece may make up a first portion of the glass component, such as the central portion 292 of the glass component 232 or the plateau of the protruding portion 336 of the glass component 334. The second region of the glass workpiece may make up a second portion of the glass component extending from the first portion, such as the peripheral portion 294 of the glass component 232 in FIG. 2 or the side of the protruding feature 336 in FIG. 3B.

The cavity mold and the core mold are typically configured to withstand elevated temperatures. In some cases, these molds may be formed from one or more materials such as high purity chromium (e.g., a purity of at least 99.95%), noble metals (e.g., Pt, Rd, Ir, or alloys thereof such as Pt—Ir), or ceramic materials such as tungsten carbide, alumina, zirconia, and the like. The ceramic materials may have fine grains. For example, these molds may be formed from bulk chromium or ceramic materials with noble metal coating, noble metal alloy coating, or ceramic coating on the core and the cavity surfaces. Examples of suitable coatings include, but are not limited to, coatings of one or more of noble metals and noble metal alloys such as Pt—Ir, oxides such as aluminum oxide, nitrides such as titanium nitride or titanium aluminum nitride, carbonitrides such as titanium carbonitride, and the like.

In some cases, a surface of a mold and/or a glass workpiece may be modified to help control the movement of the glass workpiece against the mold. The modifications may include one or more of a temporary or permanent coating, a texture, a gaseous cushion/slip plane, or the like. For example, a coating may be applied to all or part of a glass workpiece surface to lower the friction between the glass workpiece surface and the mold surface. Suitable coatings include, but are not limited to, graphite or boron nitride powder coatings or vaporizable coatings that produce a gaseous cushion between the glass workpiece surface and the mold surface. As an additional example, the mold surface may be coated to lower the friction or textured to increase the friction between the mold surface and the glass workpiece.

The process 400 includes an operation 408 of cooling the molded glass workpiece following the operation 406 and prior to the operation 410 of removing the molded glass workpiece from the frame. The operation 408 may cool the molded glass workpiece to an ambient temperature (e.g., room temperature, about 25° C.), an ambient temperature range, or a temperature range sufficiently below a transition temperature of the glass component (e.g., a strain point or a glass transition point). The operation 408 may include multiple stages as shown schematically in FIG. 5.

The process 400 may include additional operations which produce the glass component from the molded glass workpiece. For example, the process 400 may include one or more finishing operations 412. In some cases, the one or more finishing operations include a trimming operation. In the trimming operation, a portion of the molded glass workpiece (e.g., a second portion) may be at least partially removed or trimmed from another portion of the molded glass workpiece (e.g., a first portion). For example, at least some of the peripheral portion of the molded glass workpiece may be removed to obtain the desired shape of the glass component. As a particular example, the peripheral portion (e.g., flange) of a molded glass workpiece formed using a mold similar to that shown in FIG. 8 can be removed to produce a glass component having a shape similar to that shown in FIG. 2. The first portion of the molded glass workpiece (with respect to a trimming operation) may define the central portion of the glass component (e.g., the central portion 292 of the glass component 232) and the peripheral portion of the glass component (e.g., the peripheral portion 294 of the glass component 232 in FIG. 2). Any suitable separation technique may be used during the trimming operation, such as a laser separation process, a mechanical separation process, or a combination thereof.

The one or more finishing operations 412 may optionally include an operation of creating one or more through-holes through the glass component (e.g., the through-hole 362 in FIG. 3B). The operation of creating the through-hole can employ any suitable process, such as a mechanical process, a laser-based process, or a combination thereof. In additional examples, the one or more finishing operations 412 may include one or more cleaning, polishing, and/or texturing operations.

In some embodiments, the process 400 may further include an annealing operation to relieve residual thermal stresses from the heating and forming operations. The annealing operation may take place while the molded glass workpiece is in the frame or following its removal from the frame.

In additional examples, the process 400 may include a chemical strengthening operation. The glass component may be chemically strengthened by one or more ion exchange operations. During the ion exchange operation, ions present in the glass component can be exchanged for larger ions in a region extending from a surface of the glass component. The ion exchange may form a compressive stress layer (or region) extending from a surface of the glass component. In some embodiments, a compressive stress layer is formed at each of the exterior surface and the interior surface of the glass component. A tensile stress layer may be formed between these compressive stress layers.

FIG. 5 schematically shows a series of stages in a process 500 for forming a glass component. The process 500 shown in FIG. 5 may be an example of the process 400 described with respect to FIG. 4. The glass workpiece 552 and the frame 572 may be transferred from one stage to another by equipment automated to reduce the overall time of the process 500.

As shown in FIG. 5, the glass workpiece 552 is placed into a frame 572 in the stage 502. The stage 502 may correspond to the operation 402 of FIG. 4. The glass workpiece 552 and the frame 572 may be any of the glass workpieces and frames described with respect to FIG. 4. By the way of example, the glass workpiece may be larger than shown in FIG. 5 to allow the glass workpiece to extend between two faces of a sandwich frame (as shown in FIGS. 6A and 6B). In some cases, the glass workpiece 552 and the frame 572 may be placed into a cell prior to the next stage in the process 500.

While the glass workpiece 552 is in the frame 572, the glass workpiece 552 is heated in the stages 504, 506, and 508. The stages 504, 506, and 508 may correspond to the operation 404 of FIG. 4. As previously discussed with respect to FIG. 4, the number of heating stages may depend on the composition and/or shape of the glass component and is not limited to the number of stages shown in FIG. 5. Typically, at least a portion of the glass workpiece 552 is heated to a higher temperature in the stage 506 than in the stage 504 and to a higher temperature in the stage 508 than in the stage 506. The glass workpiece may be heated as described with respect to FIG. 4 and that description is not repeated here.

While the glass workpiece 552 is in the frame 572, the glass workpiece 552 is formed during the stage 510. The stage 510 may correspond to the operation 406 of FIG. 4. As previously described with respect to FIG. 4, the glass workpiece 552 may be formed between a cavity mold and a core mold and the forming operation may take place in a press. The mold(s) in which the glass workpiece 552 is formed may be cooler than the heated glass workpiece, allowing forming and cooling of the glass workpiece to take place simultaneously within the mold. The cooling of the glass workpiece within the mold may be rapid compared to the later cooling stages 512.

Following the stage 510, the molded glass workpiece is cooled during the stages 512 and 514. The stages 512 and 514 may correspond to the operation 408 of FIG. 4. The number of cooling stages is not limited to the number of stages shown in FIG. 5 and in additional examples more or fewer cooling stages may be used. The molded glass workpiece may be cooled as described with respect to FIG. 4 and that description is not repeated here.

Following the stage 514, the molded glass workpiece 562 is removed from the frame 572 in the stage 516. The stage 516 may correspond to the operation 410 of FIG. 4. As previously described with respect to example 4, the molded glass workpiece 562 may be subjected to one or more of a finishing operation, an annealing operation, and a chemical strengthening operation.

FIG. 6A schematically illustrates a cross-sectional view of an operation of heating the glass workpiece. The glass workpiece 652 of FIG. 6A is held horizontally in a frame 672 which exposes a first surface 654 and a second surface 655 of the glass workpiece. In particular, the frame 672 holds a peripheral portion 694 and exposes a central portion 692 of the glass workpiece 652.

Figure 7A:
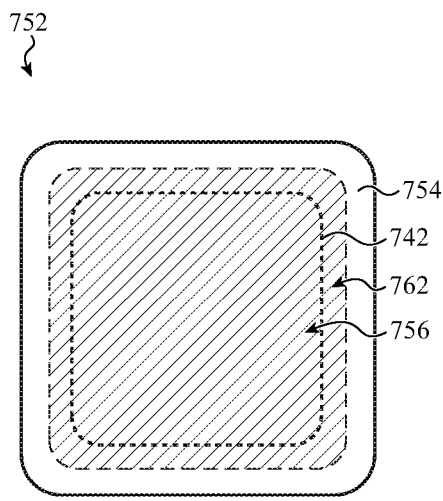
FIG. 7A schematically shows an example heating pattern for a glass workpiece.

In the example of FIG. 6A, the glass workpiece 652 is heated from above and below with a pair of heaters 682. The heaters 682 and the frame 672 are sized so that a surface of each of the heaters facing the glass workpiece fits within an opening defined by the frame 672 (see the opening 875 of FIG. 8). The heaters 682 may be configured to produce a heated region which includes the entire central portion of the glass workpiece, as schematically illustrated in FIG. 7A. In the example of FIG. 6A, each of the heaters 682 includes internal heating elements 683.

Figure 7B:
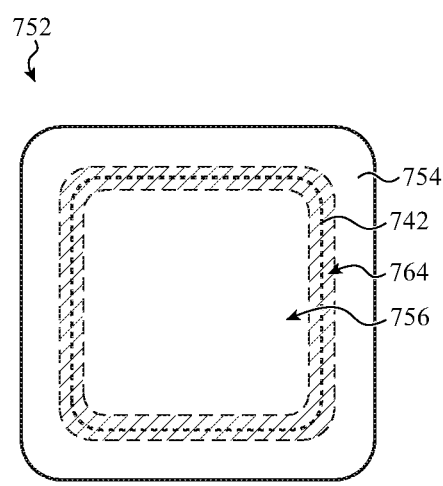
FIG. 7B schematically shows another example heating pattern for a glass workpiece.

FIG. 6B schematically illustrates a cross-sectional view of another operation of heating the glass workpiece. The glass workpiece 652 of FIG. 6B is held horizontally in a frame 672 which exposes a first surface 654 and a second surface 655 of the glass workpiece. As previously described with respect to FIG. 6A, the frame 672 holds a peripheral portion 694 and exposes a central portion 692 of the glass workpiece 652. In the example of FIG. 6B, the glass workpiece 652 is heated from above and below with a pair of heaters 684. The heaters 684 and the frame 672 are sized so that a surface of each of the heaters facing the glass workpiece fits within an opening defined by the frame 672. The heaters 684 may be configured to produce a heated region which is localized around a perimeter of the central portion of the glass workpiece, as schematically illustrated in FIG. 7B. In the example of FIG. 6B, each of the heaters 684 includes internal heating elements 685.

FIG. 7A schematically shows local heating of an entire central portion of a glass workpiece 752. The shading indicates the heated region 762 of the glass workpiece. As shown in FIG. 7A, the heated region 762 extends over the entire central portion 756 of the glass component. FIG. 7A may be an example of local heating during the operation 404 of the process 400. The heated region 762 may define a heating pattern for the glass workpiece. In some examples, the most deformation and/or reshaping occurs in the vicinity of the dashed line 742. In some cases, the dashed line may also indicate a periphery of the glass component. The peripheral portion 754 of the glass workpiece may be actively cooled or may be heated to a lesser extent than the central portion during at least a portion of a process cycle in which the glass workpiece is thermoformed.

FIG. 7B schematically illustrates local heating of less than the entire central portion of a glass workpiece 752. The shading indicates the heated region 764 of the glass workpiece. In the example of FIG. 7B, the heated region 764 is localized around a perimeter of the central portion 756 of the glass workpiece and around the dashed line 742. The heated region 764 may generally correspond to a region of localized deformation of the glass workpiece. When the glass component has a shape similar to that of the glass component 232 of FIG. 2, the heated region 764 may correspond to the peripheral region 294. The heated region 764 may define a heating pattern for the glass workpiece.

FIG. 8 shows an exploded view of a frame 870 supporting a glass workpiece 852 and a core mold 892 and a cavity mold 896. The core mold 892 and the cavity mold 896 may be used during a forming operation such as the operation 406 of FIG. 4.

As shown in FIG. 8 the glass workpiece 852 is horizontally oriented and is positioned between two frame components 872a and 872b of the frame 870. The frame component 872b supports the glass workpiece 852. The frame components 872a and 872b define a central opening 875 which exposes a central portion 882 of the glass workpiece. An exposed first surface on an underside of the glass workpiece 852 contacts the cavity mold 892 during the forming operation. An exposed second surface 855 of the glass workpiece 852 contacts the core mold 896 during the forming operation. The frame 870 and the cavity and core molds (892, 896) are sized so that a surface of each of the cavity and core molds fits within the central opening 875. The glass workpiece 852 and the frame 870 may be similar to the glass workpieces and the frames described with respect to FIG. 4 and those details are not repeated here.

The cavity mold 892 defines a cavity 893 and the core mold 896 defines a protruding feature 897. Typically, the protruding feature 897 is complementary in shape to at least a portion of the cavity 893. In the example of FIG. 8, the cavity 893 of the cavity mold 892 defines a substantially planar recessed surface 894 and a wall surface 895 extending from the planar recessed surface. A first region of the glass workpiece 852 may be molded against the substantially planar recessed surface 894 to produce a substantially planar region of the molded glass workpiece. A second region of the glass workpiece may be molded against the wall surface 895 to produce an angled region of the molded glass workpiece. The first and the second regions may be regions of the central portion 882 of the glass workpiece. The cavity mold 892 and the core mold 896 may be similar to the molds described with respect to FIG. 4 and those details are not repeated here. The mold shape shown in FIG. 8 is not intended to be limiting and in additional examples the recessed surface need not be planar but may be curved instead. In further examples, the shape and orientation of the surface extending from this recessed surface may be curved and/or at a different angle than shown in FIG. 8 as was previously described with respect to FIG. 2.

As previously discussed, the present disclosure also provides bonding techniques, which may be non-isothermal bonding techniques. FIG. 9 shows a partial cross-section view of an example glass component 934 produced using a bonding technique. The component 934 may be an example of the cover member 133 of FIG. 1B and the cross-section view may be along B-B in FIG. 1B. For simplicity, only one through-hole 962 is shown in FIG. 9. More generally, the glass component 934 may define additional through-holes as previously described with respect to FIG. 1B.

As shown in FIG. 9, the glass component 934 includes a first constituent 999 and a second constituent 996. The first constituent 999 is bonded to the second constituent 996 in the example of FIG. 9. The first constituent 999 underlies the second constituent 996, and the second constituent 996 typically has at least one lateral dimension (e.g., $W_1$) that is smaller than that of the first constituent 999.

The glass component 934 may be a glass cover member, the first constituent 999 may be a first glass constituent, and the second constituent 996 may be a second glass constituent. In additional cases, the glass component 934 is a composite member. As one example, the first constituent 999 is a first glass constituent and the second constituent 996 is a glass ceramic or ceramic component. A first constituent, such as the first constituent 999, may also be referred to herein as a first portion or in some cases as a first layer or piece. A second constituent, such as the second constituent 996, may also be referred to herein as a second portion or in some cases as a second layer or piece.

The first constituent 999 includes or defines the portion 939 of the glass component 934, also referred to herein as a base portion 939. The base portion 939 defines a base region 949 of the exterior surface 944. The first constituent 999 also includes the portion 935 underlying the protruding feature 936. The protruding feature 936 protrudes from or is at least partially offset with respect to the base portion 939. A protruding feature of a component, such as the protruding feature 936, may also be referred to generally herein as a feature.

The second constituent 996 of the glass component may at least partially define the protruding feature 936 of the glass component 934. In the example of FIG. 9, the second constituent 996 wholly defines the protruding feature 936. However, in other examples the second constituent 996 may partially define the protruding feature. For example, a finishing operation which removes part of the base region 949 of the exterior surface of the bonded workpiece may cause the first constituent to define a portion of the protruding feature.

The protruding feature 936 defines a raised region 947 of the exterior surface 944. The raised region 947 also defines a top surface of the protruding feature. The raised region 947 may define a plateau (a substantially planar surface region). In the example of FIG. 9, the raised region 947 of the exterior surface is offset by a distance $H_1$ from the base region 949 of the exterior surface. The protruding feature 936 also defines a side region 948 that extends between the raised region 947 and the base region 949 of the exterior surface 944 and a width $W_1$.

The dashed line 995 schematically indicates the boundary region between the first constituent 999 and the second constituent 996. The boundary region may join the first constituent to the second constituent. In some cases, the first constituent 999 may be fused to the second constituent 996, such as when the first constituent 999 is a first glass constituent and the second constituent 996 is a second glass constituent. When the first constituent 999 is fused to the second constituent 996 the boundary region may also be referred to herein as a fusion zone. In some embodiments, the fusion between the first constituent 999 and the second constituent 996 is substantially complete. For example, the boundary or fusion zone between the first constituent 999 and the second constituent 996 may include few, if any, voids, and any voids present may be small relative to the thickness of the first and the second constituent.

The first constituent 999 of the glass component 934 may be formed from a first layer or piece of glass and the second constituent 996 of the glass component may be formed from a second layer or piece of glass. The dashed line 995 may correspond to the boundary between the first layer or piece of glass and the second layer or piece of glass. In some cases, a distinct boundary region may be observed between the first constituent 999 and the second constituent 996. In other cases, a distinct boundary region between the first constituent 999 and the second constituent 996 may not be detected by the unaided eye.

For example, a distinct fusion zone may not be detected by the unaided eye when the first layer of glass has a composition that is substantially similar to that of the second layer of glass and fusion between the first glass constituent and the second glass constituent is substantially complete. In some cases, one or more fusion artifacts may be detected in the fusion zone such as an area of incomplete fusion, a void, a graphite, or other impurity particle arising from the bonding process, and the like. The size of any fusion artifacts may be sufficiently small that the glass component has the desired strength. In some cases, the boundary region and/or a fusion artifact may be observed by sectioning the glass component 934 and/or using non-destructive techniques. Suitable techniques for observing the boundary region and/or a fusion artifact include, but are not limited to, microscopy, elemental analysis, optical interference detection, ultrasonic detection, and the like.

As shown in FIG. 9, the glass component 934 further defines a through-hole, such as the through-hole 962. The through-hole 962 extends through the protruding feature 936 and the underlying portion 935 of the glass component 934. The first constituent 999 of the glass component 934 may define a lower or first portion of the through-hole 962 and the second constituent 996 of the glass component may define an upper or second portion of the through-hole 962.

The through-hole 962 may allow input to, output from, and/or placement of a device component such as an optical module as previously described with respect to FIG. 1B. The protruding feature 936 may further define an opening 967 to the through-hole, with the opening 967 being located in the raised region 947. In some cases, the glass component 934 may define an arrangement, array, or set of through-holes and openings extending through the protruding portion 936. For example, the glass component 934 may define any number of through-holes and openings, such as one, two, three, four, or five through-holes and openings.

In the example of FIG. 9, the raised region 947 of the exterior surface is offset by a distance $H_1$ from the base region 949 of the exterior surface. The thickness $T_2$ (the distance between the interior surface 942 and the raised region 947) is greater than the thickness $T_1$ (the distance between the interior surface 942 and the base region 949 of the exterior surface). As examples, the ratio $T_2/T_1$ may be from about 1.25 to about 3 or from about 1.5 to about 2. In some cases, the protruding feature 936 has a thickness greater than about 1 mm and less than or equal to about 2.5 mm and the base portion 939 has a thickness greater than about 0.5 mm and less than about 1 mm. The amount of protrusion or offset between the raised region 947 and the base region 949 may be from about 0.5 mm to about 1.5 mm or from about 0.75 mm to about 2 mm.

In some cases, the base region 949 and the raised region 947 may both define respective textured regions of the exterior surface 944 (also referred to herein as textured surface regions). For example, the raised region 947 may define a first texture and the base region 949 may define a second texture different than the first texture. The different textures may be created by one or more finishing processes.

FIG. 10 shows a partial cross-section view of another example glass component 1034 produced using a bonding technique. The component 1034 may be an example of the cover member 133 of FIG. 1B and the cross-section view may be along B-B in FIG. 1B. For simplicity, only one through-hole 1062 is shown in FIG. 10. More generally, the glass component 1034 may define additional through-holes as previously described with respect to FIG. 1B. The greater width of a first portion 1063*a* of the through-hole 1062 may be sized to accommodate one or more internal components of the electronic device.

As shown in FIG. 10, the glass component 1034 includes a first constituent 1099 and a second constituent 1096. The first constituent 1099 is bonded to the second constituent 1096 along a boundary region schematically indicated by the dashed line 1095. The first constituent 1099 underlies the second constituent 1096, and the second constituent 1096 typically has at least one lateral dimension (e.g., $W_2$) that is smaller than that of the first constituent 1099. As previously described with respect to FIG. 9, the first constituent 1099 may be formed from a first layer or piece of glass and the second constituent 1096 may be formed from a second layer or piece of glass. The dashed line 1095 may correspond to the boundary between the first layer or piece of glass and the second layer or piece of glass. In the example of FIG. 10, the boundary region 1095 extends around a perimeter of the second constituent 1096. The width of the boundary region 1095 is limited by the overlap between the first and the second constituents, which in turn is limited by the through-hole 1062 (and hole portions 1063*a* and 1063*b*). Therefore, the boundary region 1095 may be referred to herein as a perimeter boundary region or perimeter fusion zone.

The first constituent 1099 includes or defines the portion 1039 of the glass component 1034, also referred to herein as a base portion 1039. The base portion 1039 defines a base region 1049 of the exterior surface 1044. The first constituent 1099 also includes the portion 1035 underlying the protruding feature 1036. The protruding feature 1036 protrudes from or is at least partially offset with respect to the base portion 1039. A protruding feature of a component, such as the protruding feature 1036, may also be referred to generally herein as a feature.

The second constituent 1096 of the glass component may at least partially define the protruding feature 1036 of the glass component 1034. In the example of FIG. 10, the second constituent 1096 wholly defines the protruding feature 1036. However, in other examples the second constituent 1096 may partially define the protruding feature. For example, a finishing operation which removes part of the base region 1049 of the exterior surface of the bonded workpiece may cause the first constituent to define a portion of the protruding feature.

As shown in FIG. 10, the glass component 1034 further defines a through-hole 1062. The through-hole 1062 extends through the protruding feature 1036 and the underlying portion 1035 of the glass component 1034. The first constituent 1099 of the glass component 1034 may define a lower or first portion 1063*a* of the through-hole 1062 and the second constituent 1096 of the glass component may define an upper or second portion 1063*b* of the through-hole 1062. As shown in FIG. 10, a lateral dimension $W_3$ of the first portion 1063*a* is greater than a lateral dimension $W_4$ of the second portion 1063*b* of the through-hole 1062. In some cases, the shape of the through-hole 1062 may be achieved by forming a through-hole through the layer of glass which is to become the first constituent of the glass component 1034, as shown in the example of FIG. 13A.

The through-hole 1062 may allow input to, output from, or placement of one or more device components. For example, the second portion 1063*b* of the through-hole 1062 may allow placement of an optical module as previously described with respect to FIGS. 1B and 9. The first portion 1063a may accommodate the optical module and also accommodate one or more additional components of the electronic device.

The protruding feature 1036 defines a raised region 1047 of the exterior surface 1044. The raised region 1047 also defines a top surface of the protruding feature. The raised region 1047 may define a plateau (a substantially planar surface region). In the example of FIG. 10, the raised region 1047 of the exterior surface is offset by a distance $H_2$ from the base region 1049 of the exterior surface. The protruding feature 1036 also defines a side region 1048 that extends between the raised region 1047 and the base region 1049 of the exterior surface 1044 and a width $W_2$. The raised region 1047 of the exterior surface is offset by a distance $T_4$ from the interior surface 1042 and the base region 1049 of the exterior surface is offset by a distance $T_3$ from the interior surface 1042. The raised region 1047 also defines an opening 1067 to the through-hole 1062. The values for the distances $H_2$, $T_3$, and $T_4$ may be similar to the values described with respect to FIG. 9 for $H_1$, $T_1$, and $T_2$.

Figure 11:
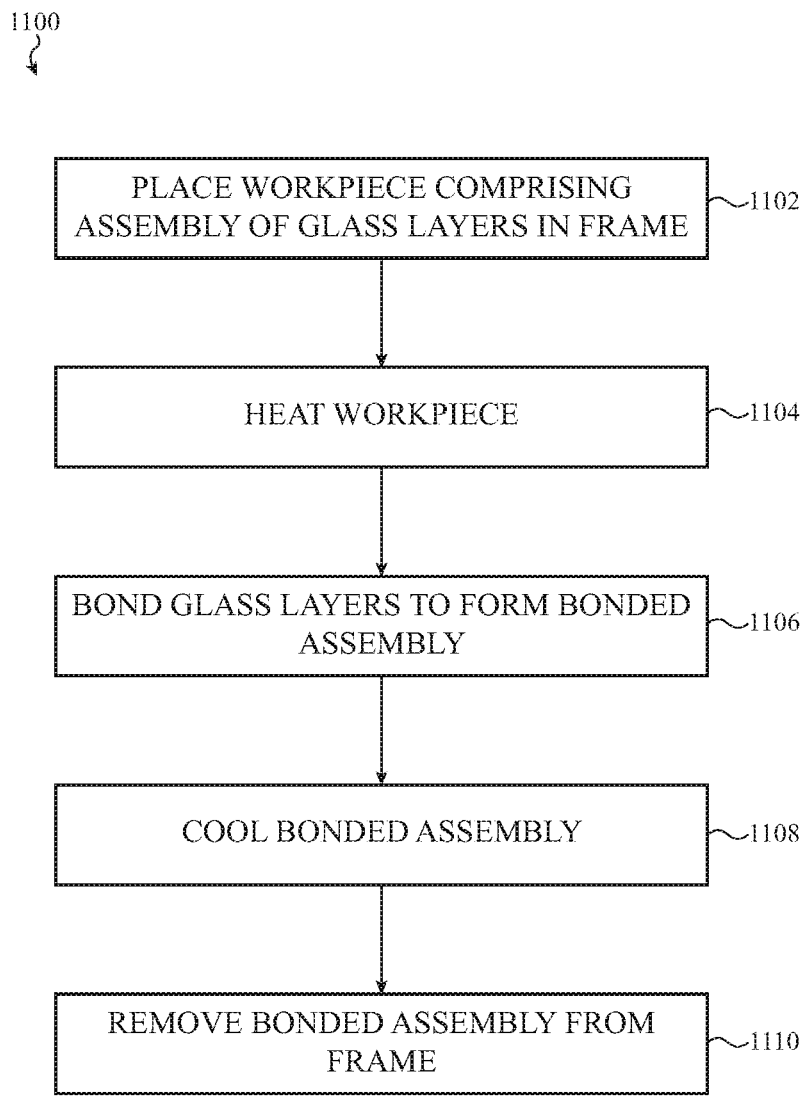
FIG. 11 shows a flow chart of a bonding process for making a glass component.

FIG. 11 shows a flow chart of an example process 1100 for making a glass component by bonding together glass layers of a workpiece. The description provided below with respect to bonding of glass layers also applies more generally to bonding of glass pieces. The process 1100 may be performed at several stations, as was previously described for the process 400. The time spent at each station may be limited to more rapidly produce the glass component. For example, the time spent at each station may be 20 seconds or less, from about 2 seconds to about 20 seconds, or from about 5 seconds to about 20 seconds.

Figure 13C:
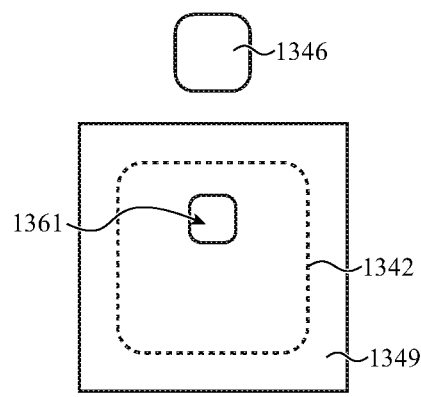
FIG. 13C shows the workpiece of FIG. 13B placed into an open frame.
Figure 13C:
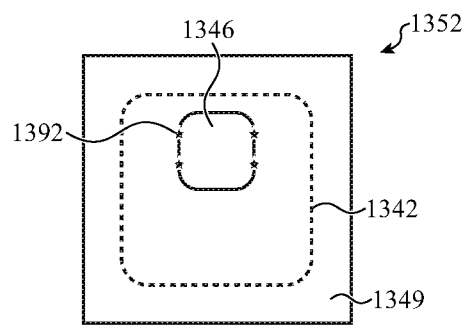
Figure 13C:
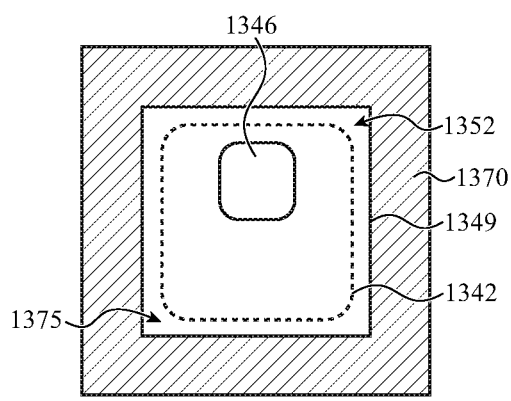

As shown in FIG. 11, the process 1100 includes an operation 1102 of placing a workpiece comprising an assembly of glass layers into a frame. The layers of the assembly may be precisely aligned with each other. In some cases, the layers may be assembled simply by placing them in contact with one another. In additional cases, the glass layers of the assembly may be at least partially bonded to maintain the position of the layers during the fusing operation. For example, laser bonding, static adhesion, optical bonding, or the like may be used to at least partially bond the layers. A separate fixture or station may be used to assemble the layers. FIGS. 12B and 13B show examples of an upper glass layer tack welded to a lower glass layer. The assembly may be performed under clean conditions to limit introduction of foreign matter between the glass layers. FIGS. 12A through 12C and 13A through 13C schematically show assembly of a workpiece and placement of the workpiece into the frame. The frame may be any of the frames previously described with respect to FIG. 4 and, for brevity, that description is not repeated here.

The glass layers used to form the workpiece may be shaped prior to assembling the glass layers. For example, the glass layers may be shaped to a desired shape and size by machining. In some embodiments, a through-hole may be formed in one or more of the glass layers prior to assembly of the layers as shown in FIG. 13A. In additional examples, the surfaces of the glass layers may be finished so that adjacent layers can closely contact each other. In some cases, the surfaces of adjacent glass layers are substantially flat and smooth. In some examples one or more of the glass layers may be cleaned and/or may be treated with one or more surface treatments such as etching and plasma treatment prior to assembly. The glass layers may be in direct contact with one another or in some embodiments an intermediate layer may be provided to enhance bonding between the glass layers. The glass layers need not have the same lateral dimensions, as shown in the examples of FIGS. 12A through 12C and 13A through 13C.

In some cases, each of the glass layers has a substantially similar composition. In additional cases, the glass layers may differ in composition. In some examples, the thickness of the first glass layer forming the first or lower portion of the glass component is from 0.5 mm to 1.0 mm, or from 0.75 mm to 1.5 mm, and the thickness of the glass layer(s) forming the upper portion(s) of the glass component is from 0.75 to 1.5 mm or from 1.0 mm to 2 mm. The composition of each of the glass layers may be as previously described with respect to FIG. 2 and that description is not repeated here.

The process 1100 also includes an operation 1104 of heating the workpiece. As examples, at least a portion of the workpiece may be heated to a temperature between the glass transition temperature and a softening point of each of the glass layers, to a temperature between an annealing point and a softening point of each of the glass layers, or to a temperature between a strain point and a softening point of each of the glass layers. The operation 1104 may take place in an air atmosphere or in a vacuum or inert gas atmosphere.

Figure 14A:
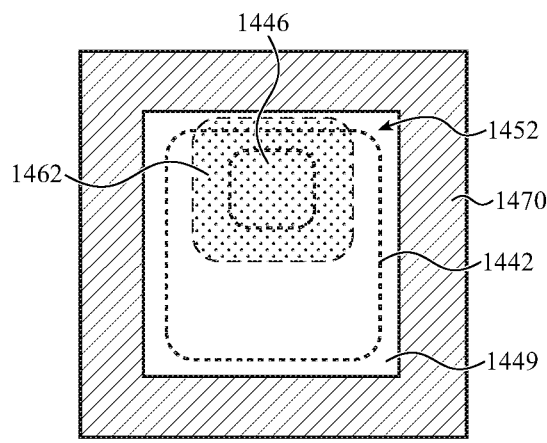
FIGS. 14A, 14B, and 14C show examples of heating patterns for heating a workpiece including an assembly of glass layers.
Figure 14B:
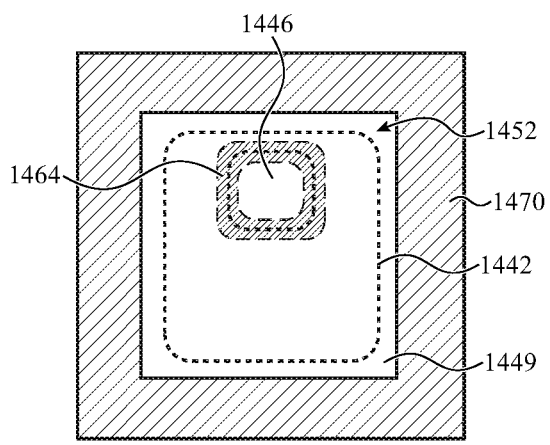
Figure 14C:
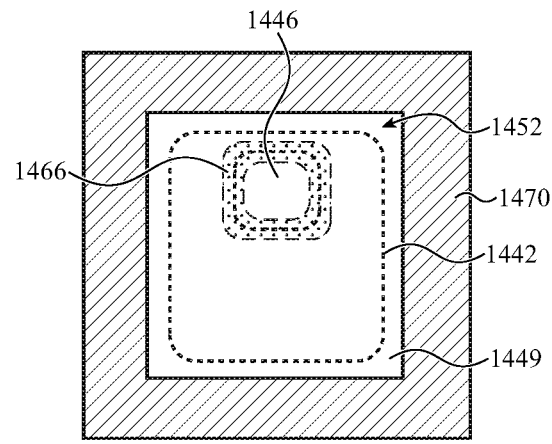

In some embodiments, the operation 1104 may locally heat the workpiece as schematically shown in FIGS. 14A, 14B, and 14C. In some cases, an upper layer of the workpiece may be heated over its entire upper surface while the lower layer is heated to a lesser extent, as shown schematically in FIG. 14A. In additional cases, the heating may be localized around a periphery of the upper layer as shown schematically in FIGS. 14B and 14C. The localized heating may form one or more temperature gradients, as schematically shown in FIG. 14C. For example, the temperature gradient may be configured to "feather" a heat affected zone in the workpiece. Alternately, the workpiece may be globally, rather than locally, heated.

Figure 15:
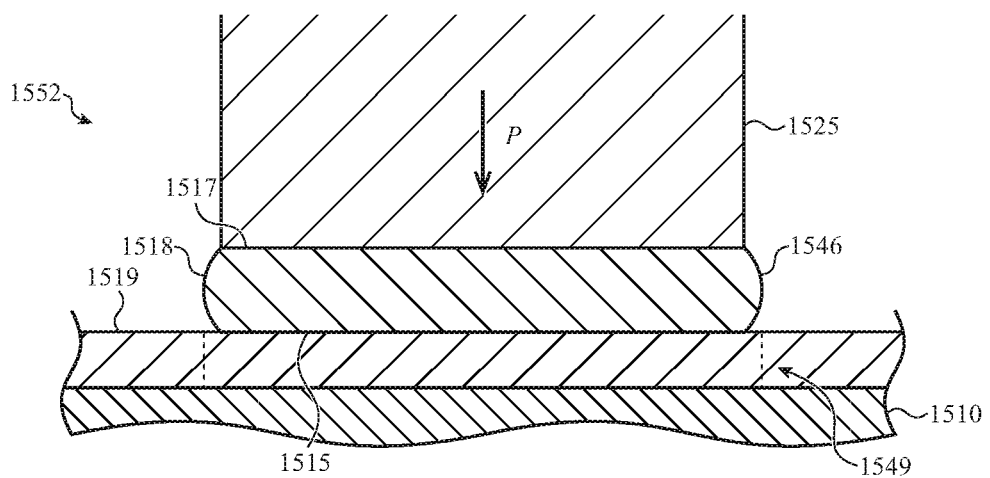
FIG. 15 shows an example of an operation of fusing a workpiece including an assembly of glass layers.

The process 1100 further includes an operation 1106 of bonding the glass layers to form a bonded assembly (which may also be referred to herein as a bonded workpiece). The operation 1106 may comprise fusing the glass layers to bond them together and the bonded assembly may be a fused assembly. In embodiments, the fusing operation comprises applying pressure to at least the upper layer of the assembly. The pressure may be applied between two tool-pieces and a press or similar apparatus may be used to apply the pressure. In some cases, each of a first tool-piece and a second tool-piece defines a planar region. In some cases, one tool piece supports the assembly of the glass layers while another tool-piece, such as plunger, piston, or the like contacts the upper layer of the assembly, as schematically illustrated in FIG. 15. In some embodiments, the tool-pieces may be press heads. The operation 1106 may take place in an air atmosphere or in a vacuum or inert gas atmosphere.

As previously discussed, the assembly of the glass layers may be preheated to a temperature between the glass transition temperature and a softening point of each of the glass layers, to a temperature between an annealing point and a softening point of each of the glass layers, or to a temperature between a strain point and a softening point of each of the glass layers. In some cases, additional energy may be supplied to the glass workpiece during the bonding operation to facilitate fusion of the glass layers. For example, the operation 1106 may be ultrasonic-assisted and/or additional heating may be provided by the tool-pieces. As a specific example, the tool-pieces may include susceptors. In additional examples the tool-pieces may be at a lower temperature than the assembly of the glass layers. For example, the tool-pieces may be at temperatures previously described with respect to the molds of process 400.

The operation 1106 creates an integrally bonded assembly, which may be a fused assembly. In some cases, one or more portions of the bonded assembly are produced from a greater number of layers than other portions of the bonded assembly. The one or more portions of the bonded assembly produced by bonding a greater number of layers may be thicker than the other portions of the bonded assembly. For example, a portion of the bonded assembly produced by bonding multiple layers of glass can have a greater thickness than a portion of the bonded assembly which is produced from a single layer of glass, as shown in the examples of FIGS. 12A through 12C and 13A through 13C. In some cases, at least a portion of a boundary region between the glass layers may be detected by the unaided eye or using other techniques after the operation of fusing the glass layers as previously discussed with respect to FIG. 9.

The one or more portions of the bonded assembly produced by bonding a greater number of layers of glass may protrude with respect to other portions of the bonded assembly. For example, a portion of the bonded assembly produced by bonding multiple layers of glass may protrude with respect to an adjacent portion produced from a single layer of glass. In particular, the thicker portion of the bonded assembly may protrude from an adjacent thinner portion of the bonded assembly. As shown in the examples of FIGS. 9 and 10, a protruding feature of the glass component may be located within the thicker portion, while the base portion of the glass component may be located within an adjacent thinner portion.

Figure 16:
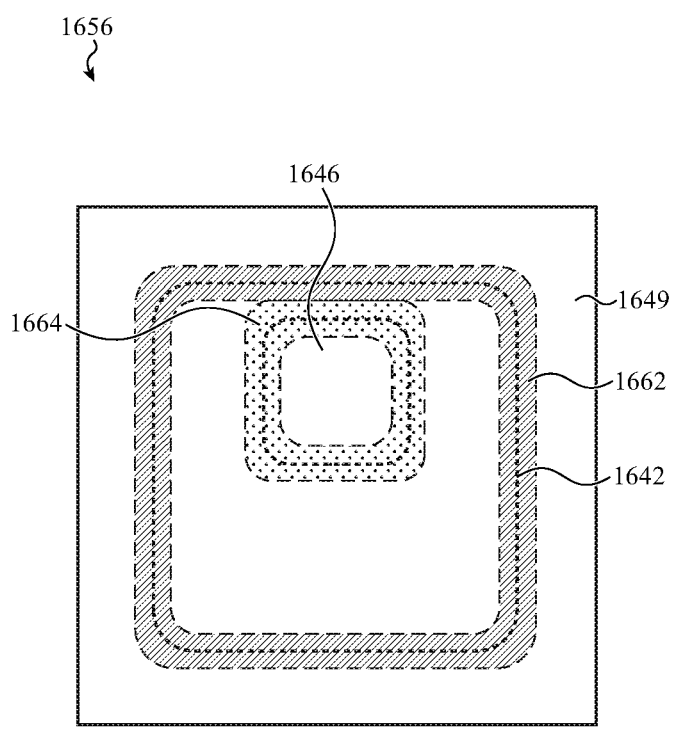
FIG. 16 shows an example heating pattern for a process which combines bonding and forming techniques.

In some embodiments, the operation 1106 of bonding the glass layers may be combined with an operation of forming one or more glass layers. For example, a heating pattern as shown in FIG. 16 may be used to locally heat the glass workpiece for a combined forming and bonding operation.

The process 1100 includes an operation 1108 of cooling the bonded assembly, which follows the operation 1106. The operation 1108 may cool the bonded assembly to an ambient temperature (e.g., room temperature), an ambient temperature range, or a temperature range sufficiently below a transition temperature of the glass component (e.g., a strain point or a glass transition point). The operation 1108 may include multiple stages. Following the operation 1108, the process 1100 includes an operation 1110 of removing the bonded assembly from the frame. As previously discussed, the bonded assembly may be a fused assembly.

In some embodiments, the bonded assembly may be ready for use as the glass component after the operation 1108. In additional embodiments, the process 1100 includes additional operations which produce the glass component from the bonded assembly. For example, the process 1100 may include one or more finishing operations. In some cases, a peripheral portion of the bonded assembly is trimmed to achieve the desired shape of the glass component and or one or more through-holes may be formed and/or enlarged (e.g., by machining). In further examples, the bonded assembly may be cleaned, textured, and/or polished. As an additional example, the process may include an annealing operation to relieve residual thermal stresses from the heating and bonding operations. The annealing operation may take place while the bonded assembly is in the frame or following its removal from the frame. In additional examples, the glass component may be chemically strengthened by one or more ion exchange operations. These operations may be similar to those described with respect to the process 400 of FIG. 4 and, for brevity, that description is not repeated here.

FIGS. 12A, 12B, and 12C schematically show an example of assembly of a workpiece and placement of the workpiece into a frame. FIG. 12A shows a first glass layer 1249 and a second glass layer 1246. The second glass layer has lateral dimensions (e.g., a width) smaller than that of the first glass layer 1249. The first glass layer 1249 and the second glass layer 1246 may have a thickness, a composition, and/or other properties as previously described for the glass layers of FIG. 11 and that description is not repeated here. The dashed line 1242 may schematically illustrate the periphery of the glass component. The position of the dashed line 1242 shown in FIG. 12A is not limiting and in some embodiments, the periphery of the glass component may correspond more closely to the periphery of the glass workpiece 1252.

As shown in FIG. 12B, the first glass layer 1249 and a second glass layer 1246 have been assembled to form a workpiece 1252. The features 1292 schematically illustrate localized adhesion of the first glass layer 1249 and a second glass layer 1246. For example, the features 1292 may be formed by laser tack welding. The positioning of the second glass layer 1246 with respect to the first glass layer 1249 depicted in FIG. 12B is exemplary rather than limiting and in additional examples the second glass layer 1246 may be placed in a central portion of the first glass layer 1249 or any other suitable location, such as over a particular electronic component of the electronic device. Any of the other methods described with respect to FIG. 11 may be used to at least partially bond the first glass layer 1249 and a second glass layer 1246.

FIG. 12C shows the workpiece 1252 after placement in a frame 1270. In the example of FIG. 12C, the layer 1249 is placed in and secured to the frame 1270 while the layer 1246 is positioned in an opening 1275 defined by the frame. The frame may be any of the frames previously described with respect to FIG. 4 and that description is not repeated here. In additional embodiments, the first glass layer may be placed in the frame prior to its assembly with the second glass layer.

FIGS. 13A, 13B, and 13C schematically show an additional example of assembly of a workpiece and placement of the workpiece into a frame. FIG. 13A shows a first glass layer 1349 and a second glass layer 1346. The second glass layer has lateral dimensions (e.g., a width) smaller than that of the first glass layer 1349. In addition, the first glass layer 1349 includes a through-hole 1361 that has lateral dimensions smaller than those of the second glass layer. Therefore, the second glass layer 1346 overlaps the first glass layer 1349 around a periphery of the through-hole 1361 and the overlap allows bonding of the first glass layer 1349 to the second glass layer 1346 (as shown in FIG. 13B). The lateral dimensions of the through-hole 1361 and the second glass layer 1346 are exemplary and not limited to those shown in FIG. 13A. The first glass layer 1349 and the second glass layer 1346 may have a thickness, a composition, and/or other properties as previously described for the glass layers of FIG. 11 and that description is not repeated here. The dashed line 1342 may schematically illustrate the periphery of the glass component. The position of the dashed line 1342 shown in FIG. 13A is not limiting and in some embodiments, the periphery of the glass component may correspond more closely to the periphery of the glass workpiece 1352.

As shown in FIG. 13B, the first glass layer 1349 and a second glass layer 1346 have been assembled to form a workpiece 1352. As previously described with respect to FIG. 13A, the first glass layer 1349 includes a through-hole 1361 that has lateral dimensions smaller than those of the second glass layer 1346. Therefore, the second glass layer 1346 can overlap the first glass layer 1349 so that the second glass layer 1346 covers the through-hole 1361 shown in FIG. 13A. The features 1392 schematically illustrate localized adhesion of the first glass layer 1349 and a second glass layer 1346. For example, the features 1392 may be formed by laser tack welding. The positioning of the second glass layer 1346 with respect to the first glass layer 1349 depicted in FIG. 13B is exemplary rather than limiting and in additional examples the second glass layer 1346 may be placed in a central portion of the first glass layer 1349 or any other suitable location, such as over a particular electronic component of the electronic device. Any of the other methods described with respect to FIG. 11 may be used to at least partially bond the first glass layer 1349 and a second glass layer 1346.

FIG. 13C shows the workpiece 1352 after placement in a frame 1370. In the example of FIG. 13C, the layer 1349 is placed in and secured to the frame 1370 while the layer 1346 is positioned in an opening 1375 defined by the frame. The frame may be any of the frames previously described with respect to FIG. 4 and that description is not repeated here. In additional embodiments, the first glass layer may be placed in the frame prior to its assembly with the second glass layer.

FIGS. 14A, 14B, and 14C schematically show examples of local heating of a workpiece for a bonding operation. The examples of FIGS. 14A, 14B, and 14C may be used in the operation 1104 of the process 1100. The workpiece 1452 includes an upper layer 1446 and a lower layer 1449. The workpiece is placed in a frame 1470. The frame 1470 may be any of the frames previously described with respect to FIG. 4 and that description is not repeated here. As previously described with respect to FIGS. 12B and 13B, the relative positioning of the layers 1446 and 1449 depicted in FIGS. 14A to 14C is exemplary rather than limiting.

In the example of FIG. 14A, the upper layer 1446 of the workpiece 1452 is heated over its entire upper surface while the lower layer 1449 is heated to a lesser extent. The heated region 1462 extends over the upper layer 1446 and over a portion of the lower layer 1449. Another portion of the lower layer 1449 that surrounds the upper layer 1446 and surrounds the underlying portion of the lower layer 1449 is not included in the heated region. In some cases, the upper layer 1446 and the underlying portion of the lower layer 1449 are heated to a higher temperature than this surrounding portion. The heated region 1462 may be uniformly heated or may include one or more temperature gradients to manage a heat affected zone of the workpiece 1452. For example, a temperature at a periphery of the heated region 1462 may be less than a temperature at a periphery of the upper layer 1446. The heated region 1462 may define a heating pattern for the workpiece.

In additional cases, the heating may be localized around a periphery of the upper layer 1446 as shown schematically in FIGS. 14B and 14C. In the example of FIG. 14B, the heated region 1464 is localized around a periphery of the upper layer 1446 and is substantially uniform. In the example of FIG. 14C, the heated region 1466 is localized around a periphery of the upper layer 1446 and forms one or more temperature gradients. For example, a temperature at a periphery of the heated region 1466 may be less than a temperature inward of this periphery. As another example, the temperature may vary around the periphery of the heated region 1466. The heated regions 1464 and 1466 may define alternate heating patterns for the workpiece. The heated regions 1464 and 1446 extend over a portion of the lower layer 1449 in the examples of FIGS. 14B and 14C. Another portion of the lower layer 1449 that surrounds the upper layer 1446 and surrounds the underlying portion of the lower layer 1449 is not included in the heated regions 1464 and 1446. In some cases, the upper layer 1446 and the underlying portion of the lower layer 1449 are heated to a higher temperature than this surrounding portion.

The dashed line 1442 in FIGS. 14A, 14B, and 14C may schematically illustrate the periphery of the glass component. The position of the dashed line 1442 shown in FIGS. 14A, 14B, and 14C is not limiting and, in some embodiments, the periphery of the glass component may correspond more closely to the periphery of the glass workpiece 1452. FIG. 15 schematically illustrates application of a pressure P to a workpiece 1552 in order to fuse the assembled glass layers 1546 and 1549. In the example of FIG. 15, the assembly 1552 includes an upper layer 1546 and a lower layer 1549. The upper layer 1546 contacts an upper surface 1519 of the lower layer 1549 and the boundary between these layers defines an interface 1515. The vertical dashed lines in FIG. 15 schematically indicate a lateral dimension of the upper layer 1546. The glass layers 1546 and 1549 may be positioned in a frame, examples of which were previously shown in FIGS. 12C, 13C, and 14A-14C.

As shown in FIG. 15, a side surface 1518 of the upper layer 1546 defines a rounded shape. The example of FIG. 15 is not limiting and the side surface 1518 may define any of a number of shapes, including a substantially planar shape or a substantially planar shape with chamfered or rounded corners.

A tool-piece 1525 is used to apply pressure to the upper surface 1517 of the upper layer 1546 during the fusing operation. In additional embodiments, pressure is applied by both the tool-piece 1525 and the tool-piece 1510. As shown in FIG. 15, the tool-piece 1525 may have the form of a plunger with a flat bottom. The shapes of the tool-pieces shown in FIG. 15 are not limiting and, in additional examples, the tool-piece 1525 may define a planar region and in some cases may include one or more non-planar regions. In additional examples, the tool-piece 1510 may define a planar region or in some cases may include one or more non-planar regions. For example, one of the tool-pieces may define a planar region and the other tool-piece may define a cavity. Typically, the upper layer 1546, the lower layer 1549, the tool-piece 1525, and the tool-piece 1510 are at an elevated temperature during the fusing operation. The tool-pieces may be made of similar materials as previously described with respect to the cavity mold and the core mold of FIG. 8. The pressure and the temperature during the fusing operation may be as previously described with respect to the operation 1106 of the process 1100 and, for brevity, those details are not repeated here.

FIG. 16 shows an example of local heating of a workpiece 1656 for a process which combines bonding and forming techniques. The workpiece 1656 may include a lower glass layer 1649 and an upper glass layer 1646. In the example of FIG. 16, the heated region 1662 is localized around the dashed line 1642 and may generally correspond to a region of localized deformation of the workpiece during the forming technique. The heated region 1664 is localized around a periphery of the layer 1646 and applies heat for the bonding technique. The workpiece 1656 includes a peripheral portion 1649 which may be supported by a frame as previously described with respect to FIGS. 4 and 11. As previously described with respect to FIGS. 12B and 13B, the relative positioning of the layers 1646 and 1649 depicted in FIG. 16 is exemplary rather than limiting.

FIG. 17 shows a block diagram of a sample electronic device that can incorporate a glass component as described herein, such as a three-dimensional glass cover member. The schematic representation depicted in FIG. 17 may correspond to components of the devices depicted in FIGS. 1A to 16 as described above. However, FIG. 17 may also more generally represent other types of electronic devices with cover assemblies as described herein.

In embodiments, an electronic device 1700 may include sensors 1720 to provide information regarding configuration and/or orientation of the electronic device in order to control the output of the display. For example, a portion of the display 1708 may be turned off, disabled, or put in a low energy state when all or part of the viewable area of the display 1708 is blocked or substantially obscured. As another example, the display 1708 may be adapted to rotate the display of graphical output based on changes in orientation of the device 1700 (e.g., 90 degrees or 180 degrees) in response to the device 1700 being rotated.

The electronic device 1700 also includes a processor 1706 operably connected with a computer-readable memory 1702. The processor 1706 may be operatively connected to the memory 1702 component via an electronic bus or bridge. The processor 1706 may be implemented as one or more computer processors or microcontrollers configured to perform operations in response to computer-readable instructions. The processor 1706 may include a central processing unit (CPU) of the device 1700. Additionally, and/or alternatively, the processor 1706 may include other electronic circuitry within the device 1700 including application specific integrated chips (ASIC) and other microcontroller devices. The processor 1706 may be configured to perform functionality described in the examples above.

The memory 1702 may include a variety of types of non-transitory computer-readable storage media, including, for example, read access memory (RAM), read-only memory (ROM), erasable programmable memory (e.g., EPROM and EEPROM), or flash memory. The memory 1702 is configured to store computer-readable instructions, sensor values, and other persistent software elements.

The electronic device 1700 may include control circuitry 1710. The control circuitry 1710 may be implemented in a single control unit and not necessarily as distinct electrical circuit elements. As used herein, "control unit" will be used synonymously with "control circuitry." The control circuitry 1710 may receive signals from the processor 1706 or from other elements of the electronic device 1700.

As shown in FIG. 17, the electronic device 1700 includes a battery 1714 that is configured to provide electrical power to the components of the electronic device 1700. The battery 1714 may include one or more power storage cells that are linked together to provide an internal supply of electrical power. The battery 1714 may be operatively coupled to power management circuitry that is configured to provide appropriate voltage and power levels for individual components or groups of components within the electronic device 1700. The battery 1714, via power management circuitry, may be configured to receive power from an external source, such as an alternating current power outlet. The battery 1714 may store received power so that the electronic device 1700 may operate without connection to an external power source for an extended period of time, which may range from several hours to several days.

In some embodiments, the electronic device 1700 includes one or more input devices 1718. The input device 1718 is a device that is configured to receive input from a user or the environment. The input device 1718 may include, for example, a push button, a touch-activated button, a capacitive touch sensor, a touch screen (e.g., a touch-sensitive display or a force-sensitive display), a capacitive touch button, a dial, a crown, or the like. In some embodiments, the input device 1718 may provide a dedicated or primary function, including, for example, a power button, volume buttons, home buttons, scroll wheels, and camera buttons.

The device 1700 may also include one or more sensors or sensor modules 1720, such as a force sensor, a capacitive sensor, an accelerometer, a barometer, a gyroscope, a proximity sensor, a light sensor, or the like. In some cases, the device 1700 includes a sensor array (also referred to as a sensing array) which includes multiple sensors 1720. For example, a sensor array associated with a protruding feature of a cover member may include an ambient light sensor, a Lidar sensor, and a microphone. As previously discussed with respect to FIG. 1B, one or more camera modules may also be associated with the protruding feature. The sensors 1720 may be operably coupled to processing circuitry. In some embodiments, the sensors 1720 may detect deformation and/or changes in configuration of the electronic device and be operably coupled to processing circuitry that controls the display based on the sensor signals. In some implementations, output from the sensors 1720 is used to reconfigure the display output to correspond to an orientation or folded/unfolded configuration or state of the device. Example sensors 1720 for this purpose include accelerometers, gyroscopes, magnetometers, and other similar types of position/orientation sensing devices. In additional examples, the sensors 1720 may include a microphone, an acoustic sensor, a light sensor (including ambient light, infrared (IR) light, and/or ultraviolet (UV) light), an optical facial recognition sensor, a depth measuring sensor (e.g., a time of flight sensor), a health monitoring sensor (e.g., an electrocardiogram (ERG) sensor, a heart rate sensor, a photoplethysmogram (PPG) sensor, and/or a pulse oximeter), a biometric sensor (e.g., a fingerprint sensor), or other types of sensing device.

In some embodiments, the electronic device 1700 includes one or more output devices 1704 configured to provide output to a user. The output device 1704 may include a display 1708 that renders visual information generated by the processor 1706. The output device 1704 may also include one or more speakers to provide audio output. The output device 1704 may also include one or more haptic devices that are configured to produce a haptic or tactile output along an exterior surface of the device 1700.

The display 1708 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1708 is a liquid-crystal display or an electrophoretic ink display, the display 1708 may also include a backlight component that can be controlled to provide variable levels of display brightness. If the display 1708 is an organic light-emitting diode or an organic electroluminescent-type display, the brightness of the display 1708 may be controlled by modifying the electrical signals that are provided to display elements. In additional examples, information regarding configuration and/or orientation of the electronic device may be used to control the output of the display as described with respect to input devices 1718. In some cases, the display is integrated with a touch and/or force sensor in order to detect touches and/or forces applied along an exterior surface of the device 1700.

The electronic device 1700 may also include a communication port 1712 that is configured to transmit and/or receive signals or electrical communication from an external or separate device. The communication port 1712 may be configured to couple to an external device via a cable, adaptor, or other type of electrical connector. In some embodiments, the communication port 1712 may be used to couple the electronic device 1700 to a host computer.

The electronic device 1700 may also include at least one accessory 1716, such as a camera, a flash for the camera, or other such device. The camera may be part of a camera assembly that may be connected to other parts of the electronic device 1700 such as the control circuitry 1710.

As used herein, the terms "about," "approximately," "substantially," "generally," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

As used herein, the phrase "one or more of" preceding a series of items, with the term "and" or "or" to separate any of the items, modifies the list as a whole, rather than each member of the list. The phrase "one or more of" does not require selection of at least one of each item listed; rather, the phrase allows a meaning that includes at a minimum one of any of the items, and/or at a minimum one of any combination of the items, and/or at a minimum one of each of the items. By way of example, the phrases "one or more of A, B, and C" or "one or more of A, B, or C" each refer to only A, only B, or only C; any combination of A, B, and C; and/or one or more of each of A, B, and C. In addition, as used herein the phrase "one or more of" preceding a series of items, with the term "and" or "or" separating the items, does not require selection of one of each item listed; rather, the phrase allows a meaning that includes at a minimum one of any of the items, and/or at a minimum one of any combination of the items, and/or at a minimum one of each of the items. Similarly, it may be appreciated that an order of elements presented for a conjunctive or disjunctive list provided herein should not be construed as limiting the disclosure to only that order provided.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A method for making a glass component for an electronic device, the method comprising:
    installing a glass workpiece to an open frame comprising an upper frame component and a lower frame component, the glass workpiece defining a sheet and having a second portion positioned between the upper and the lower frame components and retained in the open frame, a first portion of the glass workpiece having an exposed first surface and an exposed second surface opposite to the exposed first surface;
    transferring the glass workpiece retained within the open frame to a heating station;
    at the heating station, heating the glass workpiece to a temperature greater than or equal to a softening point and less than or equal to a working point of the glass workpiece;
    transferring the glass workpiece retained within the open frame to a molding station;
    at the molding station, thermoforming the first portion of the glass workpiece between a cavity mold contacting the exposed first surface and a core mold contacting the exposed second surface to produce a molded glass workpiece, each of the cavity mold and the core mold heated to a temperature less than the temperature of the glass workpiece;
    cooling the molded glass workpiece to a temperature less than a glass transition temperature of the glass workpiece;
    removing the molded glass workpiece from the open frame; and
    removing a peripheral portion of the molded glass workpiece to form the glass component, the peripheral portion including at least some of the second portion of the glass workpiece.

2. The method of claim 1, wherein:
    the glass workpiece is a sheet of aluminosilicate glass; and
    the sheet has a thickness from 300 microns to 2 mm.

3. The method of claim 2, wherein:
    the cavity mold defines:
        a planar recessed surface; and
        a wall surface extending from the planar recessed surface, the wall surface and the planar recessed surface together defining a cavity of the cavity mold;
    a first region of the first portion of the glass workpiece contacts the wall surface during the thermoforming; and
    a second region of the first portion of the glass workpiece contacts the planar recessed surface during the thermoforming.

4. The method of claim 3, wherein the first region of the glass workpiece is at a higher temperature than the second region of the glass workpiece.

5. The method of claim 3, wherein:
    the second portion of the glass workpiece is cooled during at least a portion of a process cycle in which the glass workpiece is thermoformed.

6. The method of claim 2, wherein the aluminosilicate glass is a lithium aluminosilicate glass.

7. The method of claim 1, wherein:
    the glass workpiece is clamped between the upper frame component and the lower frame component.

8. The method of claim 7, wherein a mechanical element clamps the glass workpiece between the upper frame component and the lower frame component.

9. The method of claim 1, wherein the glass component is a glass cover and defines an external surface of the electronic device.

10. The method of claim 1, wherein the core mold defines a protruding feature.

11. The method of claim 1, wherein the second portion of the glass workpiece moves within the open frame during the operation of producing the molded glass workpiece.

12. The method of claim 11, wherein a region of the second portion of the glass workpiece is thermoformed during the operation of producing the molded glass workpiece.

* * * * *